US012726097B2

(12) United States Patent
Otera et al.

(10) Patent No.: US 12,726,097 B2
(45) Date of Patent: Sep. 1, 2026

(54) VIBRATION STRUCTURE, PANEL MODULE, AND HOUSING MODULE

(71) Applicant: Murata Manufacturing Co., Ltd., Nagaokakyo (JP)

(72) Inventors: Shozo Otera, Nagaokakyo (JP); Jun Endo, Nagaokakyo (JP); Yutaka Ishiura, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 211 days.

(21) Appl. No.: 18/643,041

(22) Filed: Apr. 23, 2024

(65) Prior Publication Data

US 2024/0275254 A1 Aug. 15, 2024

Related U.S. Application Data

(63) Continuation of application No. PCT/JP2022/043452, filed on Nov. 25, 2022.

(30) Foreign Application Priority Data

Dec. 20, 2021 (JP) ................................ 2021-205891

(51) Int. Cl.
*H02K 33/18* (2006.01)
*G06F 3/01* (2006.01)
*G06F 3/0354* (2013.01)

(52) U.S. Cl.
CPC ............ *H02K 33/18* (2013.01); *G06F 3/016* (2013.01); *G06F 3/03547* (2013.01)

(58) Field of Classification Search
CPC ........ G06F 3/01; G06F 3/041; G06F 3/03547; G06F 3/016; H02K 33/18
See application file for complete search history.

(56) References Cited

U.S. PATENT DOCUMENTS 10,866,655 B2 12/2020 Kanai
2019/0163294 A1* 5/2019 Kanai .................... G06F 3/016
2022/0246825 A1 8/2022 Otera

FOREIGN PATENT DOCUMENTS

JP 2012-068823 A 4/2012
JP 2019-101562 A 6/2019
(Continued)

OTHER PUBLICATIONS

International Search Report received for PCT Patent Application No. PCT/JP2022/043452, mailed on Feb. 7, 2023, 2 pages (English Translation Only).

*Primary Examiner* — Deeprose Subedi
(74) *Attorney, Agent, or Firm* — ArentFox Schiff LLP

(57) ABSTRACT

A vibration structure that includes: a housing; a panel having a main surface; an inner frame physically connected to the panel and the housing, the inner frame including a first portion overlapping the housing as viewed in a normal direction of the main surface; an outer frame physically connected to the panel and the housing, the outer frame surrounding the inner frame as viewed in the normal direction, and the outer frame including a second portion overlapping the panel as viewed in the normal direction; and a vibration body that vibrates the panel, wherein (A) or (B): (A) the vibration body is attached to the panel or the inner frame; or (B) the vibration body is attached across the panel or the inner frame, and the housing or the outer frame.

19 Claims, 22 Drawing Sheets

(56) References Cited

FOREIGN PATENT DOCUMENTS

| | | | |
|---|---|---|---|
| WO | 2012/111351 | A1 | 8/2012 |
| WO | 2021/177268 | A1 | 9/2021 |

* cited by examiner 2, 6a, 6b

VIBRATION STRUCTURE, PANEL MODULE, AND HOUSING MODULE

CROSS REFERENCE TO RELATED APPLICATIONS

The present application is a continuation of International application No. PCT/JP2022/043452, filed Nov. 25, 2022, which claims priority to Japanese Patent Application No. 2021-205891, filed Dec. 20, 2021, the entire contents of each of which are incorporated herein by reference.

TECHNICAL FIELD

The present disclosure relates to a vibration structure including a vibration body.

BACKGROUND ART

As a conventional vibration structure, for example, a touch pad module described in Patent Document 1 is known. The touch pad module described in Patent Document 1 is a touch pad module that vibrates a touch pad, and includes an outer frame portion, a spring portion, a support portion, a substrate, and a vibration motor. The outer frame portion is fixed to a housing with a damper interposed therebetween. The spring portion connects the outer frame portion and the support portion. The support portion is disposed inside the outer frame portion. The substrate is fixed to the support portion. The touch pad is fixed to the substrate. The vibration motor is mounted on the substrate. In addition, the vibration direction of the vibration motor and the direction in which the spring portion is biased coincide with each other.

Patent Document 1: Japanese Patent Application Laid-Open No. 2019-101562

SUMMARY OF THE DISCLOSURE

Meanwhile, in the touch pad module described in Patent Document 1, it is not easy to achieve both optimization of the vibration characteristics of the touch pad and optimization of the support characteristics of the touch pad. More specifically, in the touch pad module described in Patent Document 1, only the spring portion connects the outer frame portion and the support portion. Selection of the spring portion changes the vibration characteristics of the touch pad and changes the support characteristics of the touch pad. For example, when a spring portion having a large elastic modulus is selected, the touch pad is firmly supported by the outer frame. On the other hand, the vibration of the touch pad is greatly attenuated by the spring portion. For example, when a spring portion having a small elastic modulus is selected, damping of vibration of the touch pad in the spring portion is suppressed. On the other hand, the support of the touch pad to the outer frame becomes fragile. Therefore, in the touch pad module described in Patent Document 1, it is not easy to achieve both the optimization of the vibration characteristics of the touch pad and the optimization of the support characteristics of the touch pad.

Therefore, an object of the present disclosure is to provide a vibration structure, a panel module, and a housing module that can easily realize both optimization of a vibration characteristics of a panel and optimization of a support characteristics of the panel.

A vibration structure according to an embodiment of the present disclosure is a vibration structure that includes: a housing; a panel having a main surface; an inner frame physically connected to the panel and the housing, the inner frame including a first portion overlapping the housing as viewed in a normal direction of the main surface; an outer frame physically connected to the panel and the housing, the outer frame surrounding the inner frame as viewed in the normal direction, and the outer frame including a second portion overlapping the panel as viewed in the normal direction; and a vibration body that vibrates the panel, wherein (A) or (B): (A) the vibration body is attached to the panel or the inner frame; or (B) the vibration body is attached across the panel or the inner frame, and the housing or the outer frame.

According to the vibration structure of the present disclosure, it is possible to easily realize both the optimization of the vibration characteristics of the panel and the optimization of the support characteristics of the panel.

DETAILED DESCRIPTION

First Embodiment

Figure 1:
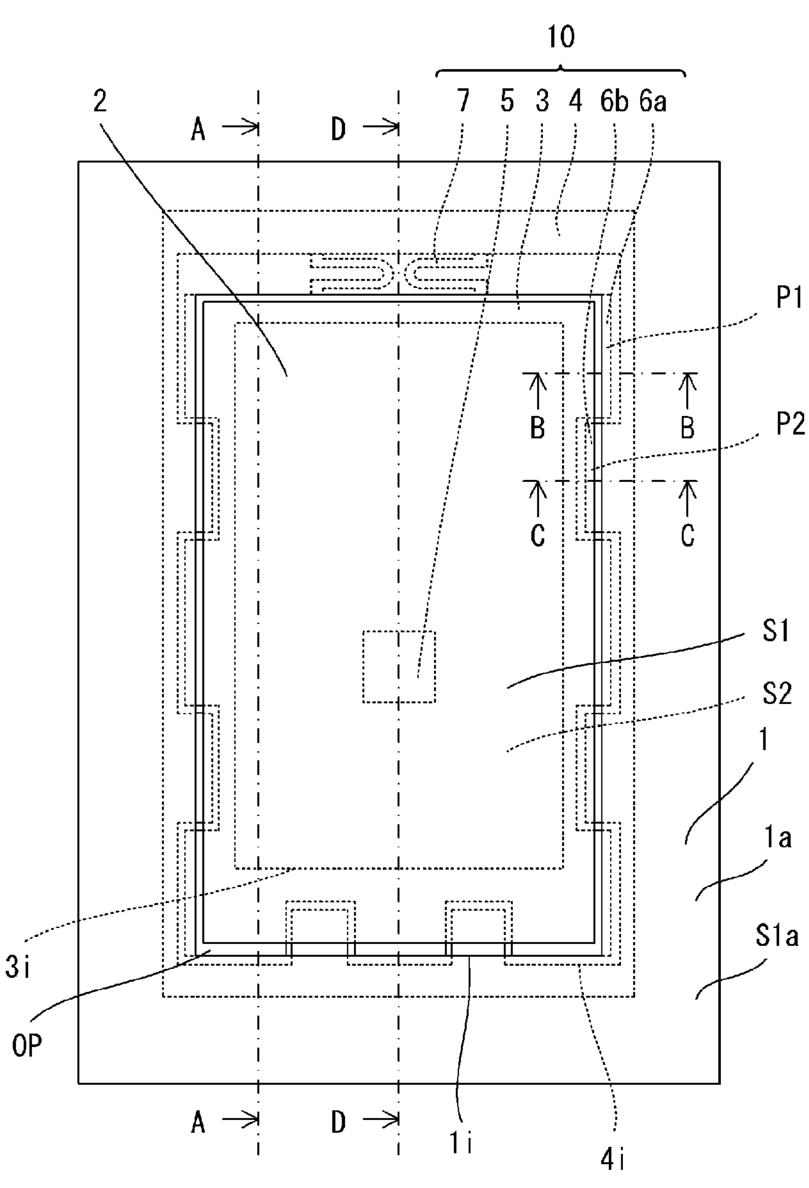
FIG. 1 is a plan view of a housing 1, a panel 2, and a vibration structure 10 according to a first embodiment as viewed in a Z− direction.
Figure 1:
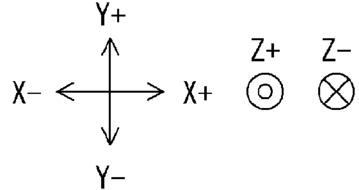
Figure 2:
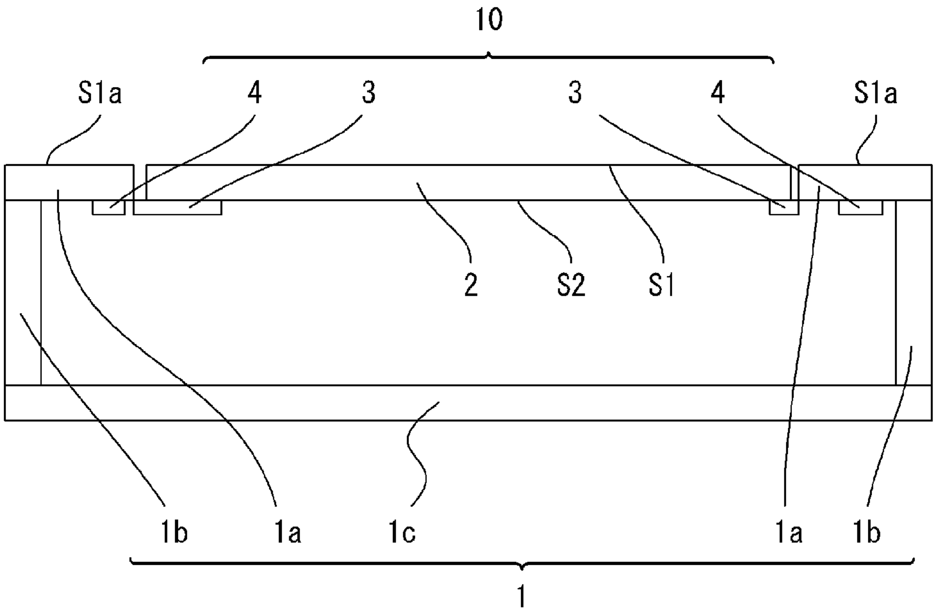
FIG. 2 is a sectional view taken along line A-A of the housing 1, the panel 2, and the vibration structure 10 according to the first embodiment.
Figure 2:
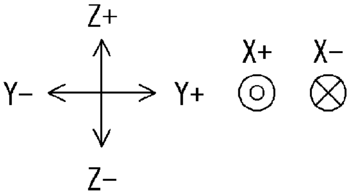
Figure 3:
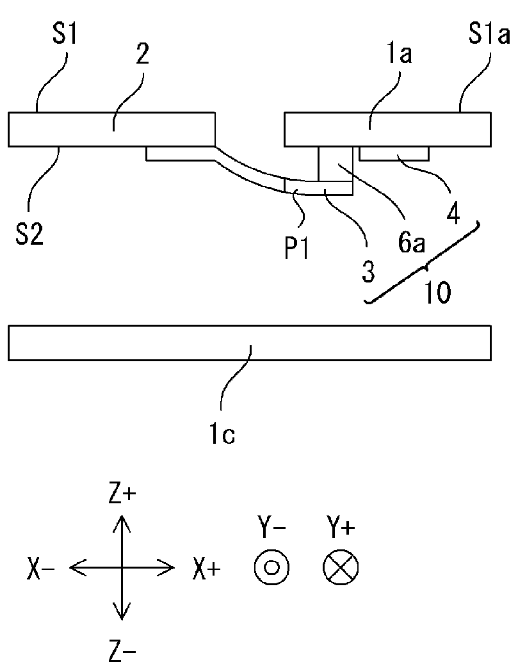
FIG. 3 is a sectional view taken along line B-B of the housing 1, the panel 2, and the vibration structure 10 according to the first embodiment.
Figure 4:
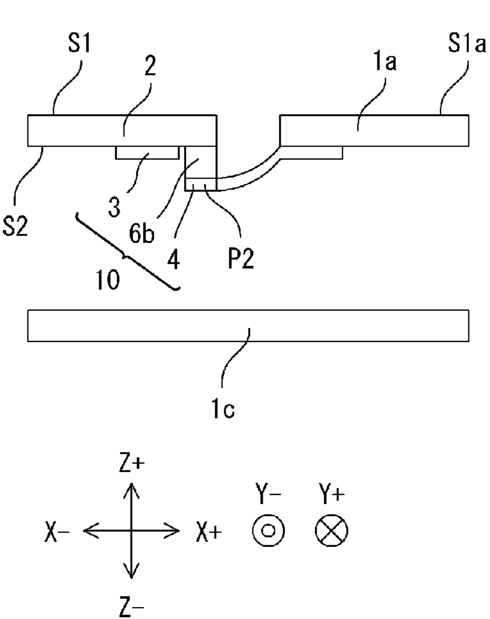
FIG. 4 is a sectional view taken along line C-C of the housing 1, the panel 2, and the vibration structure 10 according to the first embodiment.
Figure 5:
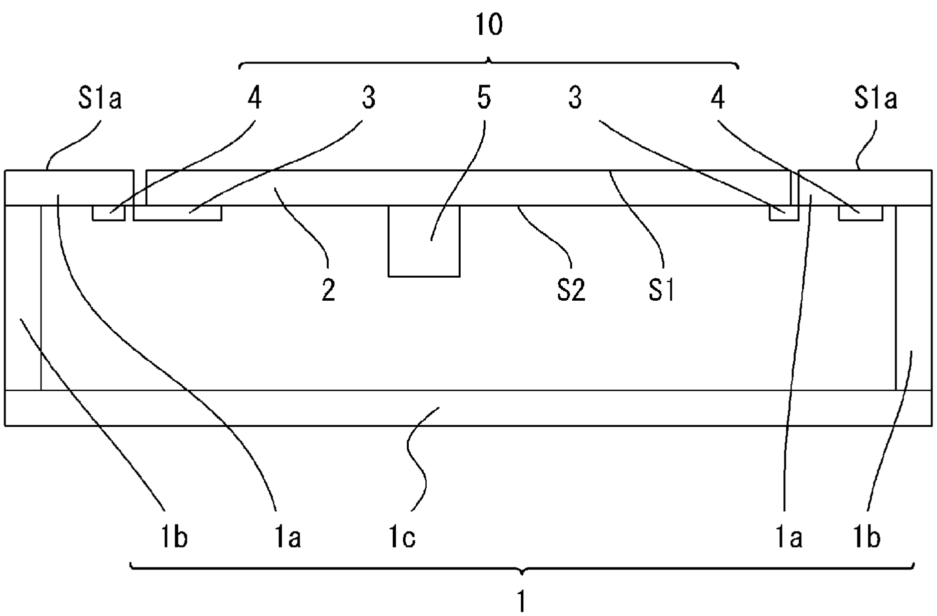
FIG. 5 is a sectional view taken along line D-D of the housing 1, the panel 2, and the vibration structure 10 according to the first embodiment.
Figure 5:
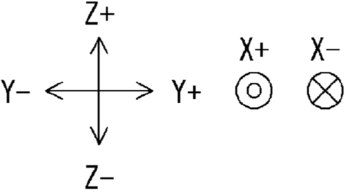
Figure 6:
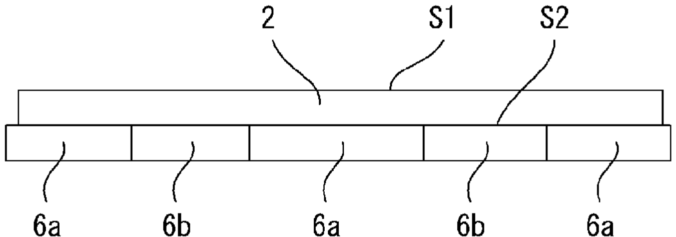
FIG. 6 is a side view of the panel 2, a first cushioning material **6*a*, and a second cushioning material 6*b*** according to the first embodiment as viewed in a X− direction.
Figure 6:
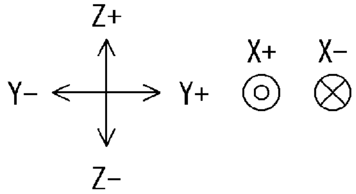

Hereinafter, a vibration structure 10 according to a first embodiment of the present disclosure will be described with reference to the drawings. FIG. 1 is a plan view of a housing 1, a panel 2, and the vibration structure 10 according to the first embodiment as viewed in a Z− direction. FIG. 2 is a sectional view taken along line A-A of the housing 1, the panel 2, and the vibration structure 10 according to the first embodiment. FIG. 3 is a sectional view taken along line B-B of the housing 1, the panel 2, and the vibration structure 10 according to the first embodiment. FIG. 4 is a sectional view taken along line C-C of the housing 1, the panel 2, and the vibration structure 10 according to the first embodiment. FIG. 5 is a sectional view taken along line D-D of the housing 1, the panel 2, and the vibration structure 10 according to the first embodiment. FIG. 6 is a side view of the panel 2, a first cushioning material 6*a*, and a second cushioning material 6*b* according to the first embodiment as viewed in the X− direction. In FIG. 1, only the representative first cushioning material 6*a*, second cushioning material 6*b*, first portion P1, and second portion P2 among the plurality of first cushioning materials 6*a*, the plurality of second cushioning materials 6*b*, the plurality of first portions P1, and the plurality of second portions P2 are denoted by reference numerals.

When any two members in the present specification are defined as a first member and a second member, "the first member and the second member are physically connected" includes both that the first member is attached to the second member so as not to be movable with respect to the second member (that is, it is fixed), and that the first member is attached to the second member so as to be movable with respect to the second member (that is, it is supported). In addition, "the first member and the second member are physically connected" includes both a case where the first member is directly attached to the second member and a case where the first member is attached to the second member with the third member interposed therebetween.

In the present specification, "the first member and the second member are electrically connected" means that electricity is conducted between the first member and the second member. Therefore, the first member and the second member may be in contact with each other, or the first member and the second member may not be in contact with each other. When the first member and the second member are not in contact with each other, a third member having conductivity is disposed between the first member and the second member.

As an example, the vibration structure 10 is used as a vibration structure that gives tactile feedback to a user by vibrating the panel 2 when the user presses the panel 2. As a result, since the panel 2 vibrates when the panel 2 is pressed, the user can feel that the panel 2 is pressed.

As an example, as illustrated in FIG. 2, the housing 1 includes a housing first portion 1*a*, a housing second portion 1*b*, and a housing third portion 1*c*. Here, a direction in which the housing first portion 1*a* and the housing third portion 1*c* are arranged is defined as a Z-axis direction. One side in the Z axis direction is a Z+ direction. The other side in the Z− direction is the Z− direction. As illustrated in FIG. 2, the housing first portion 1*a* is located in the Z+ direction from the housing third portion 1*c*. The housing first portion 1*a* includes an end of the housing 1 in the Z+ direction. The housing third portion 1*c* includes an end of the housing 1 in the Z− direction. As illustrated in FIG. 2, the housing second portion 1*b* is located between the housing first portion 1*a* and the housing third portion 1*c*.

As illustrated in FIGS. 1 and 2, the housing first portion 1*a* has a main surface S1*a*. The main surface S1*a* includes an end of the housing 1 in the Z+ direction. In the present embodiment, the normal direction of the main surface S1*a* is the Z-axis direction.

The housing 1 includes an opening OP. More specifically, in the present embodiment, as illustrated in FIG. 1, the housing first portion 1*a* has a rectangular frame shape as viewed in the Z-axis direction. Further, an inner edge 1*i* of the housing first portion 1*a* has a rectangular shape as viewed in the Z-axis direction. The opening OP is a region surrounded by the inner edge 1*i* of the housing first portion 1*a* as viewed in the Z-axis direction. That is, in the present embodiment, the opening OP has a rectangular shape as viewed in the Z-axis direction.

As illustrated in FIGS. 1 and 2, the panel 2 has a plate shape. Thus, the panel 2 includes the first main surface S1 and a second main surface S2. In the present embodiment, the normal direction of the first main surface S1 is the Z-axis direction. Further, the normal direction of the second main surface S2 is the Z-axis direction. That is, in the present embodiment, the first main surface S1 is parallel to the main surface S1*a* and the second main surface S2. Further, as illustrated in FIG. 2, the first main surface S1 is located in the Z+ direction from the second main surface S2. In the present embodiment, each of the first main surface S1 and the second main surface S2 has a rectangular shape as viewed in the Z-axis direction as illustrated in FIG. 1. Each of the first main surface S1 and the second main surface S2 has short sides and long sides.

In the present embodiment, as illustrated in FIG. 1, the panel 2 is located inside the inner edge 1*i* of the housing first portion 1*a* as viewed in the normal direction of the first main surface S1. That is, the panel 2 is surrounded by the opening OP as viewed in the normal direction of the first main surface S1. Further, the panel 2 is not in contact with the housing 1. Further, the first main surface S1 is exposed from the opening OP. Accordingly, the user can push the first main surface S1 in the Z− direction.

Here, a direction in which the short side of the first main surface S1 extends is defined as an X-axis direction. That is, the X-axis direction is orthogonal to the Z-axis direction. Further, one side in the X axis direction is an X+ direction. The other side in the X− direction is a X− direction. Further, a direction in which the long side of the first main surface S1 extends is defined as a Y-axis direction. That is, the Y-axis direction is orthogonal to the Z-axis direction and the X-axis direction. Further, one side in the Y axis direction is a Y+ direction. The other side in the Y− direction is a Y− direction.

As an example, as illustrated in FIG. 1, the vibration structure 10 includes an inner frame 3, an outer frame 4, a vibration body 5, a plurality of first cushioning materials 6*a*, a plurality of second cushioning materials 6*b*, and a spring portion 7.

In the present embodiment, as illustrated in FIG. 3, the inner frame 3 is bent in the Z-axis direction. The inner frame 3 is made of stainless steel (SUS), for example.

As illustrated in FIGS. 1 and 3, the inner frame 3 includes the first portion P1 overlapping the housing first portion 1*a* as viewed in the normal direction of the first main surface S1. That is, the first portion P1 overlaps the housing 1 as viewed in the normal direction of the first main surface S1.

In the present embodiment, as illustrated in FIG. 3, the first portion P1 is attached to the housing first portion 1*a* with the first cushioning material 6*a* to be described later interposed therebetween. Accordingly, the inner frame 3 is physically connected to the housing 1.

The inner frame 3 supports the panel 2. More specifically, as illustrated in FIG. 3, the inner frame 3 overlaps the panel 2 as viewed in the normal direction of the first main surface S1. Further, the inner frame 3 is attached to the second main surface S2 with an adhesive layer (not shown) interposed therebetween. Accordingly, the inner frame 3 is physically connected to the panel 2.

In the present embodiment, as illustrated in FIG. 4, the outer frame 4 is bent in the Z-axis direction. The outer frame 4 is made of stainless steel (SUS), for example.

As illustrated in FIGS. 1 and 4, the outer frame 4 includes the second portion P2 overlapping the panel 2 as viewed in the normal direction of the first main surface S1. That is, the second portion P2 overlaps the panel 2 as viewed in the normal direction of the first main surface S1.

In the present embodiment, as illustrated in FIG. 4, the second portion P2 is attached to the second main surface S2 with the second cushioning material 6*b* to be described later interposed therebetween. Therefore, the outer frame 4 is physically connected to the panel 2.

The outer frame 4 is fixed to the housing 1. More specifically, as shown in FIG. 4, the outer frame 4 overlaps the housing first portion 1*a* as viewed in the normal direction of the first main surface S1. The outer frame 4 is attached to the housing first portion 1*a* with an adhesive layer (not shown) interposed therebetween. Accordingly, the outer frame 4 is physically connected to the housing 1.

In the present embodiment, as illustrated in FIG. 1, the outer frame 4 has a rectangular frame shape as viewed in the normal direction of the first main surface S1. In the present embodiment, as illustrated in FIG. 1, the inner frame 3 has a rectangular frame shape as viewed in the normal direction of the first main surface S1. An inner edge 3*i* of the inner frame 3 has a rectangular shape as viewed in the Z-axis direction. As illustrated in FIG. 1, the inner frame 3 is located inside an inner edge 4*i* of the outer frame 4 as viewed in the normal direction of first main surface S1. That is, the inner frame 3 is surrounded by the outer frame 4 as viewed in the normal direction of the first main surface S1. The inner frame 3 is not in contact with the outer frame 4.

In the present embodiment, the vibration body 5 is a linear resonant actuator (LRA). The LRA includes a coil (not shown), a magnet (not shown), or a spring (not shown). The LRA generates an electromagnetic force by causing a current to flow through the coil. The LRA vibrates the coil by the generated electromagnetic force or repulsive force with the magnet or the spring.

As illustrated in FIG. 5, the vibration body 5 is attached to the second main surface S2. That is, the vibration body 5 is attached to the panel 2. As a result, the vibration body 5 vibrates the panel 2. In the present embodiment, the vibration frequency of the vibration body 5 is preferably as close as possible to the resonance frequency of the panel 2. Since the vibration frequency of the vibration body 5 is close to the resonance frequency of the panel 2, the vibration body 5 can efficiently vibrate the panel 2. The resonance frequency of the panel 2 is determined by the weight of the panel 2 and the spring constant of the spring portion 7.

The first cushioning material 6*a* is made of a material that is easily deformed when receiving an external force. As a result, the first cushioning material 6*a* does not inhibit the vibration of the panel 2. On the other hand, the first cushioning material 6*a* has a damping ratio that damps the vibration of the panel 2. The first cushioning material 6*a* is, for example, a foam material. In the present embodiment, the first cushioning material 6*a* has a rectangular parallelepiped shape.

As illustrated in FIGS. 1 and 3, the first cushioning material 6*a* overlaps the first portion P1 as viewed in the normal direction of the first main surface S1. As illustrated in FIG. 3, the first cushioning material 6*a* is located between the housing first portion 1*a* and the first portion P1 as viewed in the Y-axis direction. That is, the housing first portion 1*a*, the first cushioning material 6*a*, and the first portion P1 are arranged in this order from the Z+ direction to the Z− direction on a straight line parallel to the Z− direction. The first cushioning material 6*a* physically connects the housing first portion 1*a* and the first portion P1. That is, the first cushioning material 6*a* physically connects the housing 1 and the inner frame 3.

The second cushioning material 6*b* is made of a material that is easily deformed when receiving an external force. As a result, the second cushioning material 6*b* does not inhibit the vibration of the panel 2. On the other hand, the second cushioning material 6*b* has a damping ratio that damps the vibration of the panel 2. The second cushioning material 6*b* is, for example, a foam material. In the present embodiment, the second cushioning material 6*b* has a rectangular parallelepiped shape.

As illustrated in FIGS. 1 and 4, the second cushioning material 6*b* overlaps the second portion P2 as viewed in the normal direction of the first main surface S1. As illustrated in FIG. 4, the second cushioning material 6*b* is located between the second main surface S2 and the second portion P2 as viewed in the Y-axis direction. That is, the second main surface S2, the second cushioning material **6*b*, and the second portion P2 are arranged in this order from the Z+ direction to the Z− direction on a straight line parallel to the Z− direction. The second cushioning material 6*b* physically connects the second main surface S2 and the second portion P2. That is, the second cushioning material 6*b* physically connects the panel 2 and the outer frame 4**.

As illustrated in FIG. 1, the inner frame 3 has a shape extending along the long side of the first main surface S1 as viewed in the normal direction of the first main surface S1. That is, the inner frame 3 extends in the Y-axis direction (first direction).

The outer frame 4 has a shape extending along the long side of the first main surface S1 as viewed in the normal direction of the first main surface S1. That is, the outer frame 4 extends in the Y-axis direction (first direction).

As illustrated in FIG. 6, the first cushioning materials **6*a* and the second cushioning materials 6*b* are alternately arranged on a straight line parallel to the Y-axis direction (first direction) as viewed in the X-axis direction (frame width direction). More specifically, the first cushioning material 6*a*, the second cushioning material 6*b*, the first cushioning material 6*a*, the second cushioning material 6*b*, and the first cushioning material 6*a*** are arranged in this order from the Y− direction to the Y+ direction on a straight line parallel to the Y− direction as viewed in the X− direction.

In the present embodiment, as illustrated in FIG. 1, the spring portion 7 connects the end in the Y+ direction of the inner frame 3 and the end in the Y+ direction of the inner edge **4*i* of the outer frame 4 at the end in the Y+ direction of the vibration structure 10. The spring portion 7 has elasticity. More specifically, the spring portion 7 has a U-shape rotated counterclockwise by 90° and a U-shape rotated clockwise by 90° as viewed in the Z axis direction. Accordingly, when the spring portion 7 receives a force mainly in the Y axis direction, the spring portion 7 is elastically deformed. Therefore, the inner frame 3 is attached to the outer frame 4 so as to be movable with respect to the outer frame 4. That is, the spring portion 7 physically connects the inner frame 3 and the outer frame 4**.

Effects

According to the vibration structure 10, it is possible to easily realize both the optimization of the vibration characteristics of the panel 2 and the optimization of the support characteristics of the panel 2. More specifically, the vibration body 5 is attached to the panel 2. The panel 2 is attached to the inner frame 3. Therefore, the vibration characteristics of the panel 2 greatly depend on the vibration characteristics of the inner frame 3. Thus, the vibration characteristics of the panel 2 can be optimized by designing the vibration characteristics of the inner frame 3. On the other hand, the panel 2 is physically connected to the outer frame 4. The outer frame 4 is attached to the housing 1. Therefore, the support characteristics of the panel 2 largely depend on the mechanical strength of the outer frame 4. Thus, the support characteristics of the panel 2 can be optimized by designing the mechanical strength of the outer frame 4. As a result, according to the vibration structure 10, it is possible to easily realize both the optimization of the vibration characteristics of the panel 2 and the optimization of the support characteristics of the panel 2.

According to the vibration structure 10, it is possible to more easily realize both the optimization of the vibration characteristics of the panel 2 and the optimization of the support characteristics of the panel 2. More specifically, the first cushioning material **6*a* physically connects the housing 1 and the inner frame 3. The second cushioning material 6*b* physically connects the panel 2 and the outer frame 4. That is, the panel 2 is attached to the outer frame 4 with the second cushioning material 6*b* interposed therebetween. As a result, the vibration characteristics of the panel 2 greatly depend on the damping ratio of the first cushioning material 6*a* and the damping ratio of the second cushioning material 6*b*. Therefore, the vibration characteristics of the panel 2 can be optimized by designing the damping ratio of the first cushioning material 6*a* and the damping ratio of the second cushioning material 6*b*. On the other hand, the support characteristics of the panel 2 largely depend on the mechanical strength of the outer frame 4. Thus, the support characteristics of the panel 2 can be optimized by designing the mechanical strength of the outer frame 4. As a result, according to the vibration structure 10, it is possible to more easily realize both the optimization of the vibration characteristics of the panel 2 and the optimization of the support characteristics of the panel 2**.

According to the vibration structure 10, damping of vibration of the panel 2 can be suppressed. More specifically, the first cushioning materials **6*a* and the second cushioning materials 6*b* are alternately arranged on a straight line parallel to the first direction (Y-axis direction) in which the inner frame 3 and the outer frame 4 extend as viewed in the frame width direction (X-axis direction). As a result, the first cushioning materials 6*a* do not overlap the second cushioning materials 6*b* as viewed in the X-axis direction. Similarly, the second cushioning materials 6*b* do not overlap the first cushioning materials 6*a* as viewed in the X-axis direction. Therefore, the total of the volumes of the plurality of first cushioning materials 6*a* and the volumes of the plurality of second cushioning materials 6*b* can be suppressed to be low. Each of the first cushioning materials 6*a* and the second cushioning materials 6*b* has a damping ratio that damps vibration of the panel 2. Therefore, by suppressing the total of the volumes of the plurality of first cushioning materials 6*a* and the volumes of the plurality of second cushioning materials 6*b* to be low, it is possible to suppress the attenuation of the vibration of the panel 2 in the first cushioning materials 6*a* and the second cushioning materials 6*b*. As a result, according to the vibration structure 10, damping of vibration of the panel 2** can be suppressed.

According to the vibration structure 10, the panel 2 can be vibrated with a larger displacement. More specifically, the spring portion 7 having elasticity physically connects the inner frame 3 and the outer frame 4. When the vibration frequency of the vibration body 5 is a resonance frequency determined by the weight of the panel 2 and the spring constant of the spring portion 7, the panel 2 can be vibrated with a larger displacement. As a result, according to the vibration structure 10, the panel 2 can be vibrated with a larger displacement.

According to the vibration structure 10, it is possible to prevent the panel 2 from being separated from the housing 1. More specifically, the housing 1 includes the opening OP. The panel 2 is surrounded by the opening OP as viewed in the normal direction of the first main surface S1. Further, the first main surface S1 is exposed from the opening OP. Accordingly, the user can push the first main surface S1 in the Z− direction. On the other hand, the inner frame 3 includes the first portion P1 overlapping the housing first portion **1*a* as viewed in the normal direction of the first main surface S1. As a result, for example, when the panel 2 receives a large force in the Z+ direction, such as when the housing 1 falls, the inner frame 3 can keep holding the panel 2. As a result, according to the vibration structure 10, it is possible to prevent the panel 2 from being separated from the housing 1**.

[First Modification]

Figure 7:
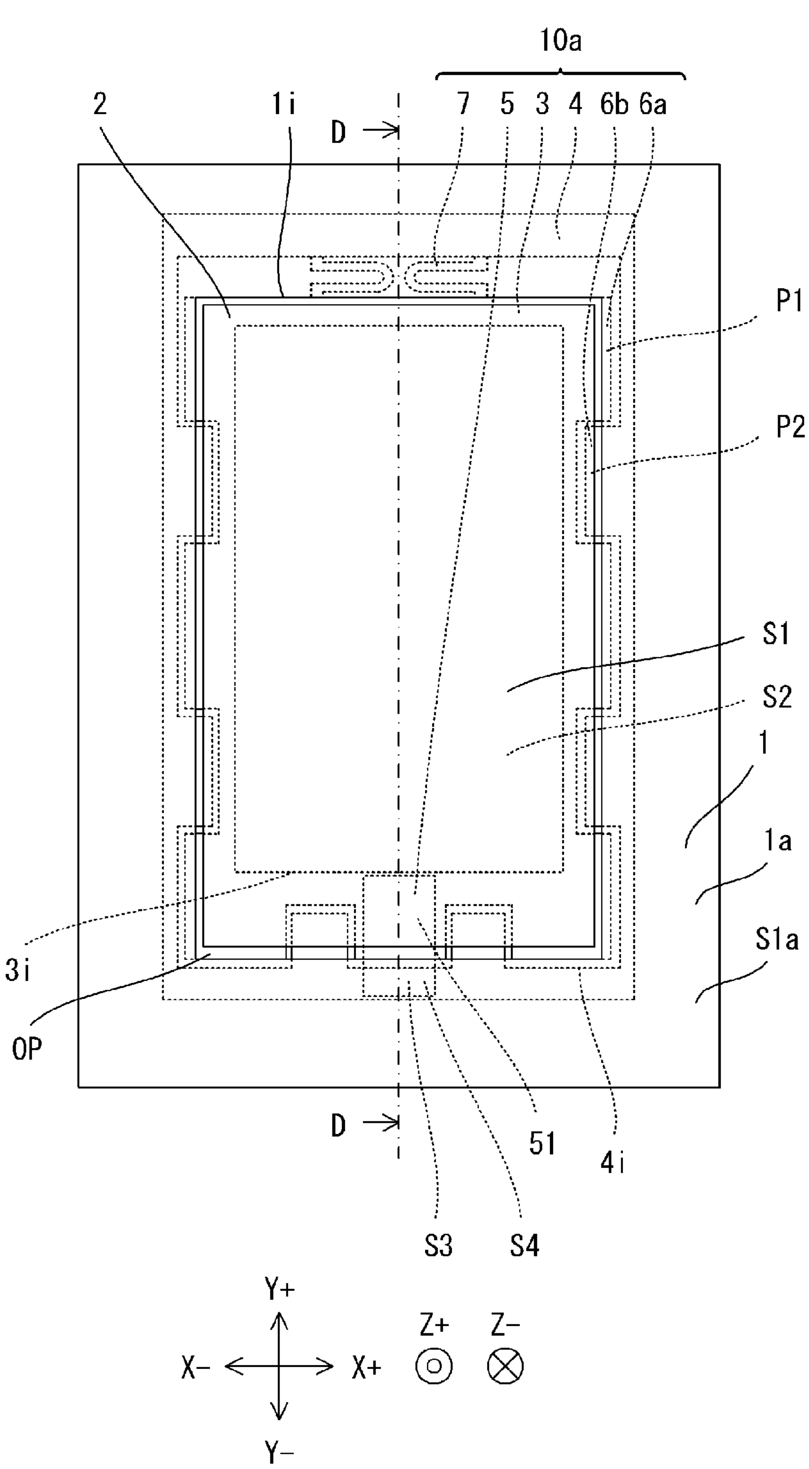
FIG. 7 is a plan view of the housing 1, the panel 2, and a vibration structure **10*a*** according to a first modification as viewed in the Z− direction.
Figure 8:
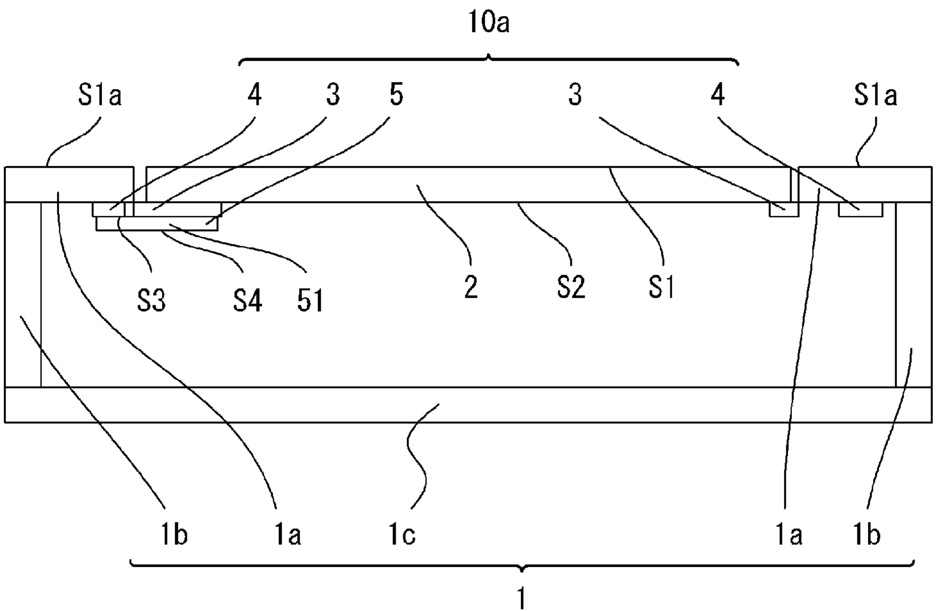
FIG. 8 is a sectional view taken along line D-D of the housing 1, the panel 2, and a vibration structure **10*a*** according to the first modification.
Figure 8:
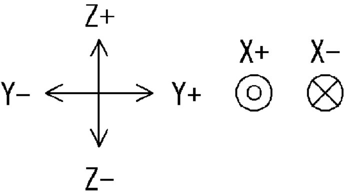

Hereinafter, a vibration structure 10*a* according to a first modification will be described with reference to the drawings. FIG. 7 is a plan view of the housing 1, the panel 2, and the vibration structure 10*a* according to the first modification as viewed in the Z− direction. FIG. 8 is a sectional view taken along line D-D of the housing 1, the panel 2, and the vibration structure 10*a* according to the first modification. In FIG. 7, only the representative first cushioning material 6*a*, second cushioning material 6*b*, first portion P1, and second portion P2 among the plurality of first cushioning materials 6*a*, the plurality of second cushioning materials 6*b*, the plurality of first portions P1, and the plurality of second portions P2 are denoted by reference numerals. Note that, in the vibration structure 10*a* according to the first modification, only portions different from those of the vibration structure 10 according to the first embodiment will be described, and the description thereof will be omitted.

The vibration structure 10*a* differs from the vibration structure 10 in a position where the vibration body 5 is attached and a type of the vibration body 5.

In the present modification, as illustrated in FIGS. 7 and 8, the vibration body 5 is mounted across the inner frame 3 and the outer frame 4.

In the present modification, the vibration body 5 includes a piezoelectric film 51. The piezoelectric film 51 has a third main surface S3 and a fourth main surface S4. As illustrated in FIG. 7, each of the third main surface S3 and the fourth main surface S4 has a rectangular shape having short sides extending in the X-axis direction and long sides extending in the Y-axis direction.

As illustrated in FIG. 7, the end of the piezoelectric film 51 in the Y+ direction overlaps the panel 2 and the inner frame 3 as viewed in the Z-axis direction. The end of the piezoelectric film 51 in the Y− direction overlaps the housing first portion 1*a* and the outer frame 4 as viewed in the Z− direction. At this time, the piezoelectric film 51 is stretched between the inner frame 3 and the outer frame 4 such that the inner frame 3 is pulled in the Y− direction by the piezoelectric film 51 and the outer frame 4 is pulled in the Y+ direction by the piezoelectric film 51. As a result, tension is generated in the piezoelectric film 51 such that the piezoelectric film 51 contracts in the Y-axis direction.

The piezoelectric film 51 is, for example, a film made of polyvinylidene fluoride (PVDF). The PVDF outputs, for example, a d31 component corresponding to expansion and contraction in a direction parallel to the third main surface S3 and the fourth main surface S4 and a d33 component corresponding to expansion and contraction in a direction orthogonal to the third main surface S3 and the fourth main surface S4. An electrode (not shown) is provided on each of the third main surface S3 and the fourth main surface S4.

When a voltage is applied between an electrode (not shown) provided on the third main surface S3 and an electrode (not shown) provided on the fourth main surface S4, the piezoelectric film 51 expands and contracts in the Y-axis direction according to the voltage. That is, the piezoelectric film 51 vibrates the panel 2 when a voltage is applied thereto.

The above-described vibration structure 10*a* also achieves the same effect as the vibration structure 10.

Second Embodiment

Figure 9:
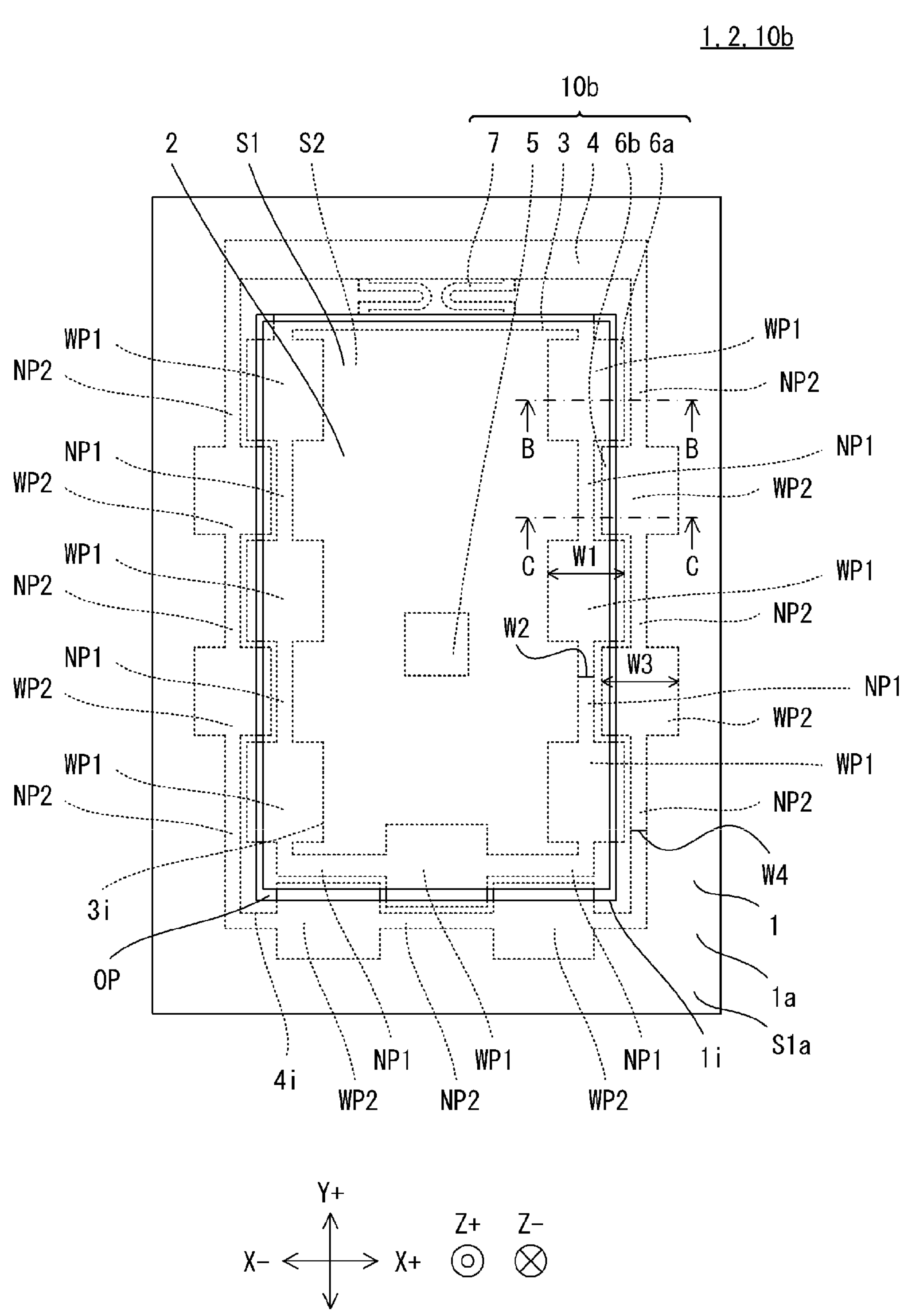
FIG. 9 is a plan view of the housing 1, the panel 2, and a vibration structure **10*b*** according to the second embodiment as viewed in the Z− direction.
Figure 10:
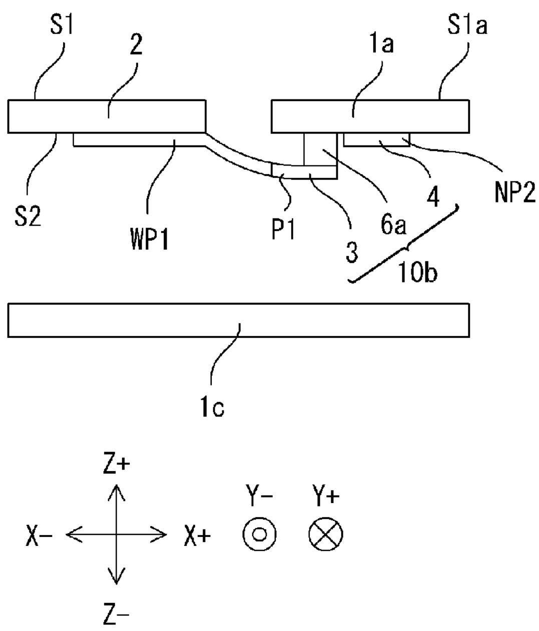
FIG. 10 is a sectional view taken along line B-B of the housing 1, the panel 2, and the vibration structure **10*b*** according to the second embodiment.
Figure 11:
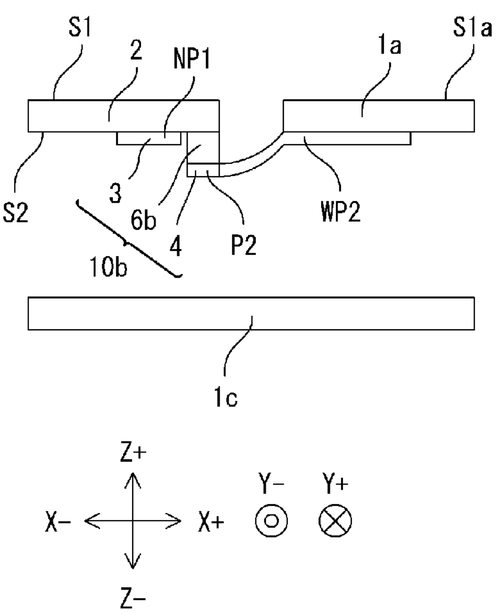
FIG. 11 is a sectional view taken along line C-C of the housing 1, the panel 2, and the vibration structure **10*b*** according to the second embodiment.

Hereinafter, a vibration structure 10*b* according to a second embodiment will be described with reference to the drawings. FIG. 9 is a plan view of the housing 1, the panel 2, and the vibration structure 10*b* according to the second embodiment as viewed in the Z− direction. FIG. 10 is a sectional view taken along line B-B of the housing 1, the panel 2, and the vibration structure 10*b* according to the second embodiment. FIG. 11 is a sectional view taken along line C-C of the housing 1, the panel 2, and the vibration structure 10*b* according to the second embodiment. In FIG. 9, only representative first cushioning material 6*a* and second cushioning material 6*b* among the plurality of first cushioning materials 6*a* and the plurality of second cushioning materials 6*b* are denoted by reference numerals. Note that, in the vibration structure 10*b* according to the second embodiment, only portions different from those of the vibration structure 10 according to the first embodiment will be described, and the description thereof will be omitted.

The vibration structure 10*b* differs from the vibration structure 10 in the shapes of the inner frame 3 and the outer frame 4. In the present embodiment, the width is defined as a length in the X-axis direction (frame width direction).

In the present embodiment, as illustrated in FIG. 9, the inner frame 3 includes a plurality of first wide portions WP1 and a plurality of first narrow portions NP1. In the present embodiment, widths W1 of the plurality of first wide portions WP1 are equal to each other. Widths W2 of the plurality of first narrow portions NP1 are equal to each other. The width W1 of each of the plurality of first wide portions WP1 is wider than the width W2 of each of the plurality of first narrow portions NP1. That is, the width W2 of each of the plurality of first narrow portions NP1 is narrower than the width W1 of each of the plurality of first wide portions WP1. Each of the plurality of first wide portions WP1 and the plurality of first narrow portions NP1 are arranged on a straight line parallel to the Y-axis direction.

In the present embodiment, as illustrated in FIG. 9, the outer frame 4 includes a plurality of second wide portions WP2 and a plurality of second narrow portions NP2. In the present embodiment, widths W3 of the plurality of second wide portions WP2 are equal to each other. Widths W4 of the plurality of second narrow portions NP2 are equal to each other. The width W3 of each of the plurality of second wide portions WP2 is wider than the width W4 of each of the plurality of second narrow portions NP2. That is, the width W4 of the second narrow portion NP2 is narrower than the width W3 of the second wide portion WP2. Each of the plurality of second narrow portions NP2 and the plurality of second wide portions WP2 are arranged on a straight line parallel to the Y-axis direction.

As illustrated in FIG. 9, each of the plurality of first wide portions WP1 is aligned with each of the plurality of second narrow portions NP2 as viewed in the normal direction of the first main surface S1. More specifically, each of the plurality of first wide portions WP1 and the plurality of second narrow portions NP2 are arranged on a straight line parallel to the X-axis direction.

As illustrated in FIG. 9, each of the plurality of first narrow portions NP1 is aligned with each of the plurality of second wide portions WP2 as viewed in the normal direction of the first main surface S1. More specifically, each of the plurality of first narrow portions NP1 and the plurality of second wide portions WP2 are arranged on a straight line parallel to the X-axis direction.

The inner frame 3 is physically connected to the housing 1 by the first wide portion WP1. More specifically, as illustrated in FIG. 10, the first wide portion WP1 includes the first portion P1 overlapping the housing first portion 1*a* as viewed in the normal direction of the first main surface S1. The first portion P1 is attached to the housing first portion 1*a* with the first cushioning material 6*a* interposed therebetween. Therefore, the inner frame 3 is physically connected to the housing 1 by the first wide portion WP1.

The outer frame 4 is physically connected to the panel 2 by the second wide portion WP2. More specifically, as illustrated in FIG. 11, the second wide portion WP2 includes a second portion P2 overlapping the panel 2 as viewed in the normal direction of the first main surface S1. The second portion P2 is attached to the second main surface S2 with the second cushioning material 6*b* interposed therebetween. Therefore, the outer frame 4 is physically connected to the panel 2 by the second wide portion WP2.

The above-described vibration structure 10*b* also achieves the same effect as the vibration structure 10. Further, according to the vibration structure 10*b*, a physical connection state between the inner frame 3 and the housing 1 and the panel 2 can be stabilized. More specifically, the inner frame 3 includes the first wide portions WP1 having a wide width. This makes it possible to enlarge a region where the inner frame 3 overlaps the panel 2 as viewed in the normal direction of the first main surface S1. Therefore, the panel 2 can be more firmly supported by the inner frame 3. In addition, the area of the first portion P1 where the inner frame 3 overlaps the housing first portion 1*a* as viewed in the normal direction of the first main surface S1 can be increased. As a result, the volume of the first cushioning material 6*a* can be increased. Therefore, the first cushioning material 6*a* is more easily deformed when receiving an external force. As a result, when the panel 2 receives a large force in the Z− direction, the first cushioning material 6*a* is deformed, so that the housing 1 can continuously support the inner frame 3. That is, the physical connection state between the inner frame 3 and the housing 1 can be stabilized. Therefore, according to the vibration structure 10*b*, the physical connection state between the inner frame 3 and the housing 1 and the panel 2 can be stabilized.

Further, according to the vibration structure 10*b*, a physical connection state between the outer frame 4 and the housing 1 and the panel 2 can be stabilized. More specifically, the outer frame 4 includes the second wide portions WP2 having a wide width. Accordingly, as viewed in the normal direction of the first main surface S1, a region where the outer frame 4 overlaps the housing first portion 1*a* can be enlarged. Therefore, the outer frame 4 can be more firmly fixed to the housing 1. In addition, the area of the second portion P2 where the outer frame 4 overlaps the panel 2 as viewed in the normal direction of the first main surface S1 can be increased. As a result, the volume of the second cushioning material 6*b* can be increased. Therefore, the second cushioning material 6*b* is more easily deformed when receiving an external force. As a result, when the panel 2 receives a large force in the Z− direction, the second cushioning material 6*b* is deformed, so that the outer frame 4 can continuously support the panel 2. That is, the physical connection state between the outer frame 4 and the panel 2 can be stabilized. Therefore, according to the vibration structure 10*b*, the physical connection state between the outer frame 4 and the housing 1 and the panel 2 can be stabilized.

Third Embodiment

Figure 12:
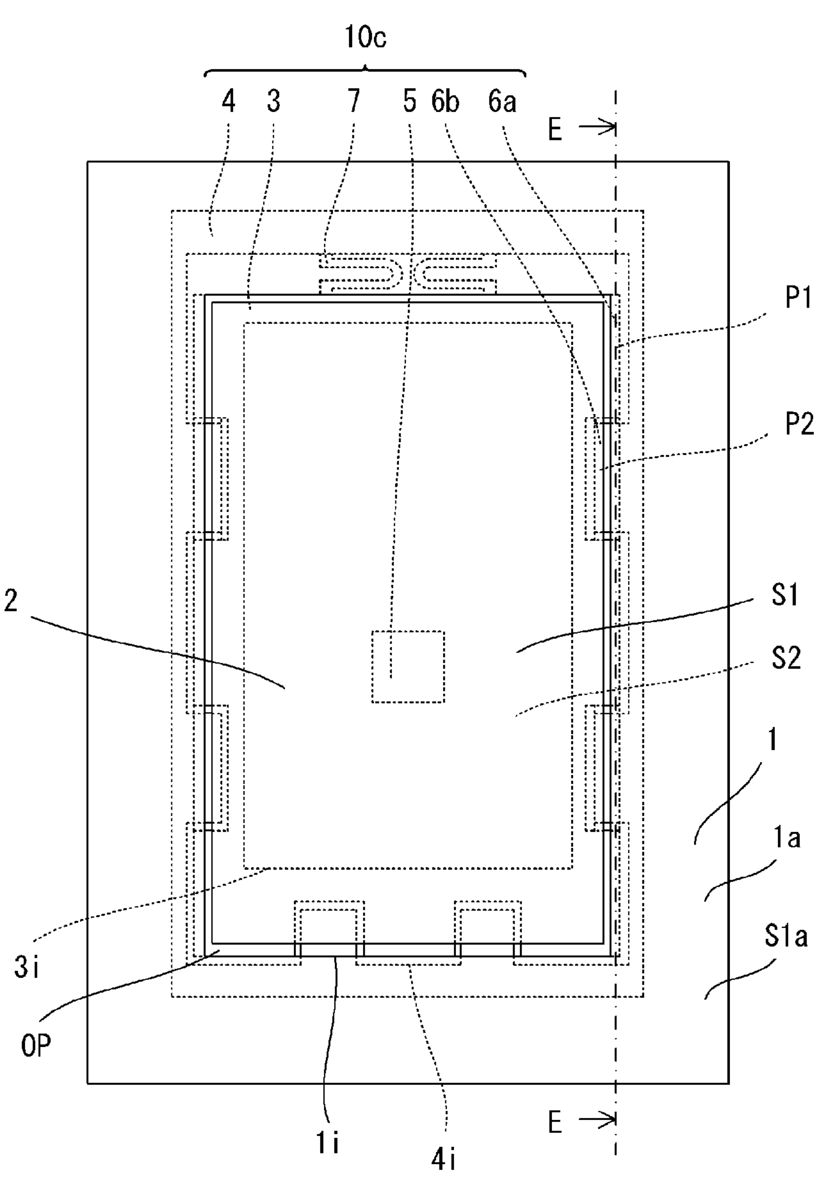
FIG. 12 is a plan view of the housing 1, the panel 2, and a vibration structure **10*c*** according to a third embodiment as viewed in the Z− direction.
Figure 12:
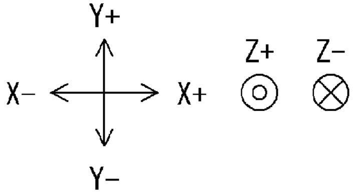
Figure 13:
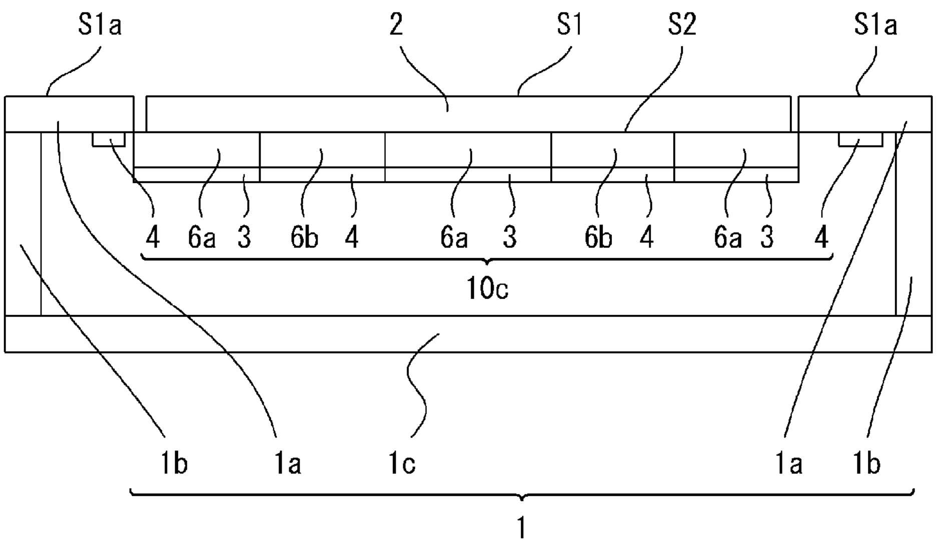
FIG. 13 is a sectional view taken along line E-E of the housing 1, the panel 2, and the vibration structure **10*c*** according to the third embodiment.
Figure 13:
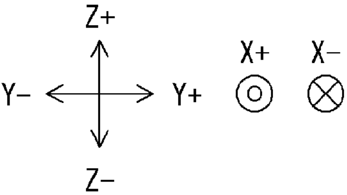

Hereinafter, a vibration structure 10*c* according to a third embodiment will be described with reference to the drawings. FIG. 12 is a plan view of the housing 1, the panel 2, and the vibration structure 10*c* according to the third embodiment as viewed in the Z− direction. FIG. 13 is a sectional view taken along line E-E of the housing 1, the panel 2, and the vibration structure 10*c* according to the third embodiment. In FIG. 12, only the representative first cushioning material 6*a*, second cushioning material 6*b*, first portion P1, and second portion P2 among the plurality of first cushioning materials 6*a*, the plurality of second cushioning materials 6*b*, the plurality of first portions P1, and the plurality of second portions P2 are denoted by reference numerals. Note that, in the vibration structure 10*c* according to the third embodiment, only portions different from those of the vibration structure 10 according to the first embodiment will be described, and the description thereof will be omitted.

The vibration structure 10*c* is different from the vibration structure 10 in the shape of the second cushioning material 6*b*.

In the present embodiment, each of the plurality of second cushioning materials 6*b* overlaps the housing first portion 1*a* as shown in FIG. 12. As a result, as illustrated in FIG. 13, the first cushioning material 6*a* and the second cushioning material 6*b* are disposed in contact with each other on a straight line parallel to the Y-axis direction (first direction).

The above-described vibration structure 10*c* also achieves the same effect as the vibration structure 10. Further, according to the vibration structure 10*c*, the dustproof effect can be improved. More specifically, the first cushioning material 6*a* and the second cushioning material 6*b* are disposed in contact with each other on a straight line parallel to the Y-axis direction. As a result, the gap between the first cushioning material 6*a* and the second cushioning material 6*b* can be reduced. Therefore, for example, the first cushioning material 6*a* and the second cushioning material 6*b* located at the end in the X+ direction of the panel 2 as viewed in the normal direction of the first main surface S1 prevent dust flying from the X+ direction from the first cushioning material 6*a* and the second cushioning material 6*b* from entering in the X− direction from the first cushioning material 6*a* and the second cushioning material 6*b*. Further, for example, the first cushioning material 6*a* and the second cushioning material 6*b* located at the end in the X− direction of the panel 2 as viewed in the normal direction of the first main surface S1 prevent dust flying from the X− direction from the first cushioning material 6*a* and the second cushioning material 6*b* from entering in the X+ direction from the first cushioning material 6*a* and the second cushioning material 6*b*. As a result, according to the vibration structure 10*c*, the dustproof effect can be improved.

Fourth Embodiment

Figure 14:
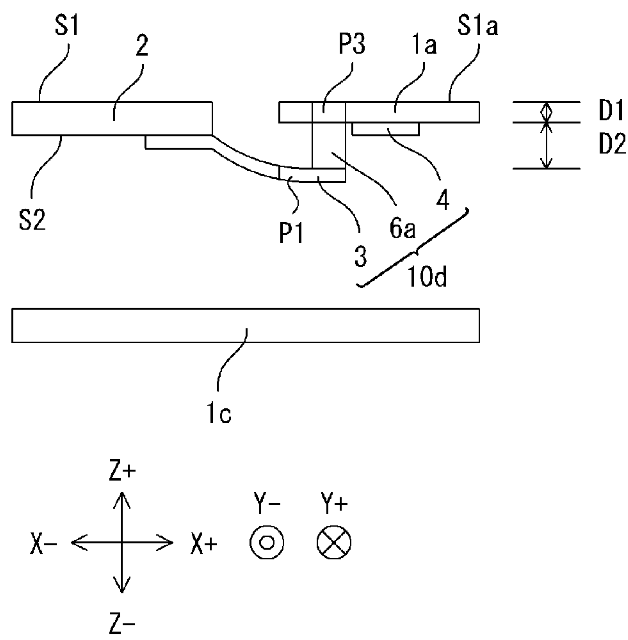
FIG. 14 is a sectional view taken along line B-B of the housing 1, the panel 2, and a vibration structure **10*d*** according to a fourth embodiment.
Figure 15:
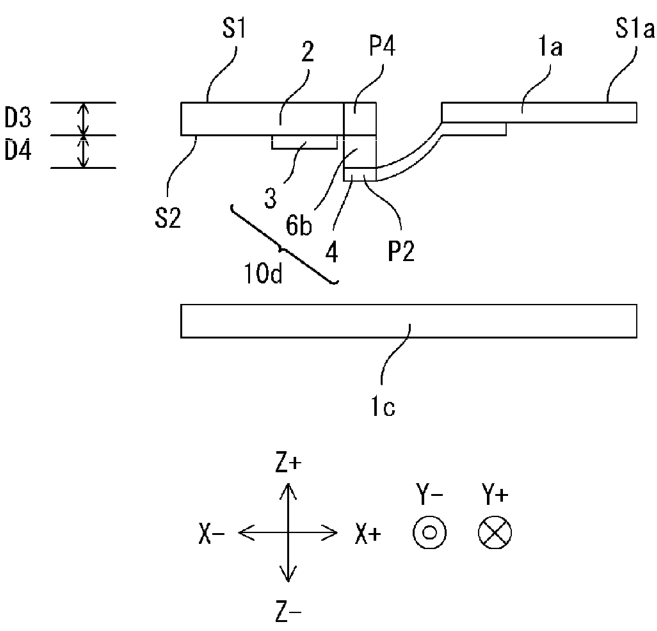
FIG. 15 is a sectional view taken along line C-C of the housing 1, the panel 2, and a vibration structure **10*d*** according to the fourth embodiment.

Hereinafter, a vibration structure 10*d* according to a fourth embodiment will be described with reference to the drawings. FIG. 14 is a sectional view taken along line B-B of the housing 1, the panel 2, and the vibration structure 10*d* according to the fourth embodiment. FIG. 15 is a sectional view taken along line C-C of the housing 1, the panel 2, and the vibration structure 10*d* according to the fourth embodiment. Note that, in the vibration structure 10*d* according to the fourth embodiment, only portions different from those of the vibration structure 10 according to the first embodiment will be described, and the description thereof will be omitted.

The vibration structure 10*d* differs from the vibration structure 10 in the thickness of the panel 2, the thickness of the housing first portion 1*a*, the thickness D2 of the first cushioning material 6*a*, and the thickness D4 of the second cushioning material 6*b*. In the present embodiment, the thickness is defined as a length in the Z-axis direction (normal direction of the first main surface S1).

As illustrated in FIG. 14, the housing first portion 1*a* includes a third portion P3 overlapping the first cushioning material 6*a* as viewed in the normal direction of the first main surface S1. That is, the housing 1 includes the third portion P3 overlapping the first cushioning material 6*a* as viewed in the normal direction of the first main surface S1.

As illustrated in FIG. 14, the third portion P3, the first cushioning material 6*a*, and the first portion P1 are arranged in this order on a straight line parallel to the Z− direction without any space from the Z+ direction to the Z− direction. That is, the housing first portion 1*a*, the first cushioning material 6*a*, and the inner frame 3 are arranged in this order on a straight line parallel to the Z− direction without any space from the Z+ direction to the Z− direction. In the present embodiment, a thickness D1 of the third portion P3 and a thickness D2 of the first cushioning material 6*a* are uniform as illustrated in FIG. 14.

As illustrated in FIG. 15, the panel 2 includes a fourth portion P4 overlapping the second cushioning material 6*b* as viewed in the normal direction of the first main surface S1.

As illustrated in FIG. 15, the fourth portion P4, the second cushioning material 6*b*, and the second portion P2 are arranged in this order on a straight line parallel to the Z− direction without any space from the Z+ direction to the Z− direction. That is, the panel 2, the second cushioning material 6*b*, and the outer frame 4 are arranged in this order on a straight line parallel to the Z− direction without any space from the Z+ direction to the Z− direction. In the present embodiment, a thickness D3 of the fourth portion P4 and a thickness D4 of the second cushioning material 6*b* are uniform as illustrated in FIG. 15.

In the present embodiment, the sum of the thickness D1 of the third portion P3 and the thickness D2 of the first cushioning material 6*a* is equal to the sum of the thickness D3 of the fourth portion P4 and the thickness D4 of the second cushioning material 6*b*. As illustrated in FIGS. 14 and 15, the position of the first portion P1 in the Z axis direction is equal to the position of the second portion P2 in the Z axis direction.

The above-described vibration structure 10*d* also achieves the same effect as the vibration structure 10. Further, according to the vibration structure 10*d*, the operability of the user can be improved. More specifically, the third portion P3, the first cushioning material 6*a*, and the first portion P1 are arranged in this order on a straight line parallel to the Z− direction without any space from the Z+ direction to the Z− direction. In addition, the fourth portion P4, the second cushioning material 6*b*, and the second portion P2 are arranged in this order on a straight line parallel to the Z− direction without any space from the Z+ direction to the Z− direction. Further, the sum of the thickness D1 of the third portion P3 and the thickness D2 of the first cushioning material 6*a* is equal to the sum of the thickness D3 of the fourth portion P4 and the thickness D4 of the second cushioning material 6*b*. Therefore, according to the vibration structure 10*d*, by equalizing the position of the first portion P1 in the Z-axis direction and the position of the second portion P2 in the Z-axis direction, the position of the main surface S1*a* in the Z-axis direction and the position of the first main surface S1 in the Z-axis direction can be equalized. As a result, according to the vibration structure 10*d*, a part of the body of the user can be prevented from being caught between the first main surface S1 and the main surface S1*a*, and the operability of the user can be improved.

[Second Modification]

Figure 16:
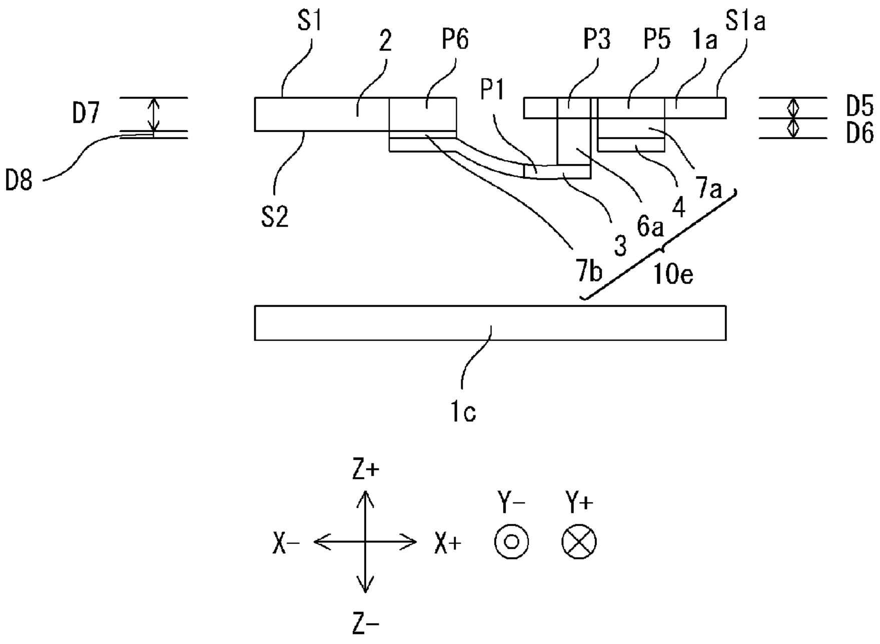
FIG. 16 is a sectional view taken along line B-B of the housing 1, the panel 2, and a vibration structure 10*e* according to a second modification.

Hereinafter, a vibration structure 10*e* according to a second modification will be described with reference to the drawings. FIG. 16 is a sectional view taken along line B-B of the housing 1, the panel 2, and the vibration structure 10*e* according to the second modification. Note that, in the vibration structure 10*e* according to the second modification, only portions different from those of the vibration structure 10*d* according to the fourth embodiment will be described, and the description thereof will be omitted.

The vibration structure 10*e* is different from the vibration structure 10*d* in further including a first adhesive material 7*a* and a second adhesive material 7*b*.

The first adhesive material 7*a* physically connects the housing 1 and the outer frame 4. More specifically, the first adhesive material 7*a* fixes the outer frame 4 to the housing first portion 1*a*. The first adhesive material 7*a* is, for example, a double-sided tape.

As illustrated in FIG. 16, the housing first portion 1*a* includes a fifth portion P5 overlapping the first adhesive material 7*a* as viewed in the normal direction of the first main surface S1. That is, the housing 1 includes the fifth portion P5 overlapping the first adhesive material 7*a* as viewed in the normal direction of the first main surface S1.

As illustrated in FIG. 16, the fifth portion P5, the first adhesive material 7*a*, and the outer frame 4 are arranged in this order on a straight line parallel to the Z− direction without any space from the Z+ direction to the Z− direction. That is, the housing first portion 1*a*, the first adhesive material 7*a*, and the outer frame 4 are arranged in this order on a straight line parallel to the Z− direction without any space from the Z+ direction to the Z− direction. In the present modification, the thickness D5 of the fifth portion P5 and the thickness D6 of the first adhesive material 7*a* are uniform as illustrated in FIG. 16.

The second adhesive material 7*b* physically connects the panel 2 and the inner frame 3. More specifically, the second adhesive material 7*b* fixes the inner frame 3 to the second main surface S2. The second adhesive material 7*b* is, for example, a double-sided tape.

As illustrated in FIG. 16, the panel 2 includes a sixth portion P6 overlapping the second adhesive material 7*b* as viewed in the normal direction of the first main surface S1. That is, the panel 2 includes the sixth portion P6 overlapping the second adhesive material 7*b* as viewed in the normal direction of the first main surface S1.

As illustrated in FIG. 16, the sixth portion P6, the second adhesive material 7*b*, and the inner frame 3 are arranged in this order on a straight line parallel to the Z− direction without any space from the Z+ direction to the Z− direction. That is, the panel 2, the second adhesive material 7*b*, and the inner frame 3 are arranged in this order on a straight line parallel to the Z− direction without any space from the Z+ direction to the Z− direction. In the present modification, a thickness D7 of the sixth portion P6 and a thickness D8 of the second adhesive material 7*b* are uniform as illustrated in FIG. 16.

In the present modification, the sum of the thickness D5 of the fifth portion P5 and the thickness D6 of the first adhesive material 7*a* is equal to the sum of the thickness D7 of the sixth portion P6 and the thickness D8 of the second adhesive material 7*b*. As illustrated in FIG. 16, the position in the Z-axis direction of the portion of the outer frame 4 overlapping the fifth portion P5 and the first adhesive material 7*a* as viewed in the Z-axis direction is equal to the position of the portion of the inner frame 3 in the Z-axis direction overlapping the sixth portion P6 and the second adhesive material 7*b* as viewed in the Z-axis direction.

The above-described vibration structure 10*e* also achieves the same effect as the vibration structure 10*d*. More specifically, the fifth portion P5, the first adhesive material 7*a*, and the outer frame 4 are arranged in this order on a straight line parallel to the Z− direction without any space from the Z+ direction to the Z− direction. The sixth portion P6, the second adhesive material 7*b*, and the inner frame 3 are arranged in this order on a straight line parallel to the Z− direction without any space from the Z+ direction to the Z− direction. Further, the sum of the thickness D5 of the fifth portion P5 and the thickness D6 of the first adhesive material 7*a* is equal to the sum of the thickness D7 of the sixth portion P6 and the thickness D8 of the second adhesive material 7*b*. Therefore, according to the vibration structure 10*d*, the position of the main surface S1*a* in the Z axis direction and the position of the first main surface S1 in the Z axis direction can be equalized by equalizing the position in the Z axis direction of the portion of the outer frame 4 overlapping the fifth portion P5 and the first adhesive material 7*a* as viewed in the Z axis direction and the position in the Z axis direction of the portion of the inner frame 3 overlapping the sixth portion P6 and the second adhesive material 7*b* as viewed in the Z axis direction. As a result, according to the vibration structure 10*d*, a part of the body of the user can be prevented from being caught between the first main surface S1 and the main surface S1*a*, and the operability of the user can be improved.

[Third Modification]

Figure 17:
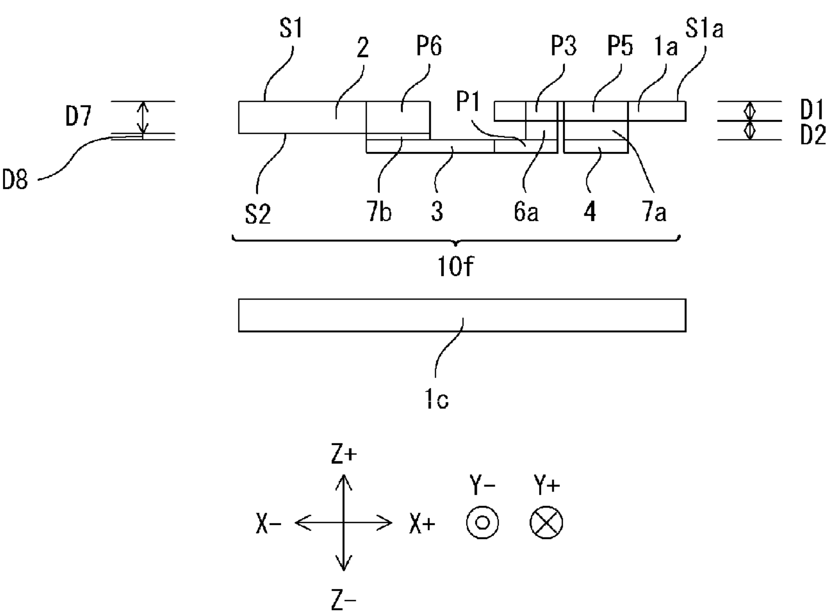
FIG. 17 is a sectional view taken along line B-B of the housing 1, the panel 2, and a vibration structure 10*f* according to a third modification.

Hereinafter, a vibration structure 10*f* according to a third modification will be described with reference to the drawings. FIG. 17 is a sectional view taken along line B-B of the housing 1, the panel 2, and the vibration structure 10*f* according to the third modification. Note that, in the vibration structure 10*f* according to the third modification, only portions different from those of the vibration structure 10*d* according to the fourth embodiment will be described, and the description thereof will be omitted.

The vibration structure 10*f* is different from the vibration structure 10*d* in further including the second adhesive material 7*b*.

The second adhesive material 7*b* physically connects the panel 2 and the inner frame 3. More specifically, the second adhesive material 7*b* fixes the inner frame 3 to the second main surface S2. The second adhesive material 7*b* is, for example, a double-sided tape.

As illustrated in FIG. 17, the panel 2 includes the sixth portion P6 overlapping the second adhesive material 7*b* as viewed in the normal direction of the first main surface S1. That is, the panel 2 includes the sixth portion P6 overlapping the second adhesive material 7*b* as viewed in the normal direction of the first main surface S1.

As illustrated in FIG. 17, the sixth portion P6, the second adhesive material 7*b*, and the inner frame 3 are arranged in this order on a straight line parallel to the Z− direction without any space from the Z+ direction to the Z− direction. That is, the panel 2, the second adhesive material 7*b*, and the inner frame 3 are arranged in this order on a straight line parallel to the Z− direction without any space from the Z+ direction to the Z− direction. In the present modification, a thickness D7 of the sixth portion P6 and a thickness D8 of the second adhesive material 7*b* are uniform as illustrated in FIG. 17.

In the present modification, the sum of the thickness D1 of the third portion P3 and the thickness D2 of the first cushioning material 6*a* is equal to the sum of the thickness D7 of the sixth portion P6 and the thickness D8 of the second adhesive material 7*b*. As illustrated in FIG. 17, the inner frame 3 is not bent in the Z-axis direction. That is, as illustrated in FIG. 17, the position in the Z axis direction of the portion of the inner frame 3 overlapping the sixth portion P6 and the second adhesive material 7*b* as viewed in the Z axis direction is equal to the position of the first portion P1 in the Z axis direction.

The above-described vibration structure 10*f* also achieves the same effect as the vibration structure 10*d*. More specifically, the third portion P3, the first cushioning material 6*a*, and the first portion P1 are arranged in this order on a straight line parallel to the Z− direction without any space from the Z+ direction to the Z− direction. The sixth portion P6, the second adhesive material 7*b*, and the inner frame 3 are arranged in this order on a straight line parallel to the Z− direction without any space from the Z+ direction to the Z− direction. The sum of the thickness D1 of the third portion P3 and the thickness D2 of the first cushioning material 6*a* is equal to the sum of the thickness D7 of the sixth portion P6 and the thickness D8 of the second adhesive material 7*b*. Therefore, according to the vibration structure 10*f*, the position of the main surface S1*a* in the Z-axis direction and the position of the first main surface S1 in the Z-axis direction can be equalized by equalizing the position of the portion of the inner frame 3 in the Z-axis direction overlapping the sixth portion P6 and the second adhesive material 7*b* as viewed in the Z-axis direction and the position of the first portion P1 in the Z-axis direction. As a result, according to the vibration structure 10*f*, a part of the body of the user can be prevented from being caught between the first main surface S1 and the main surface S1*a*, and the operability of the user can be improved.

[Fourth Modification]

Figure 18:
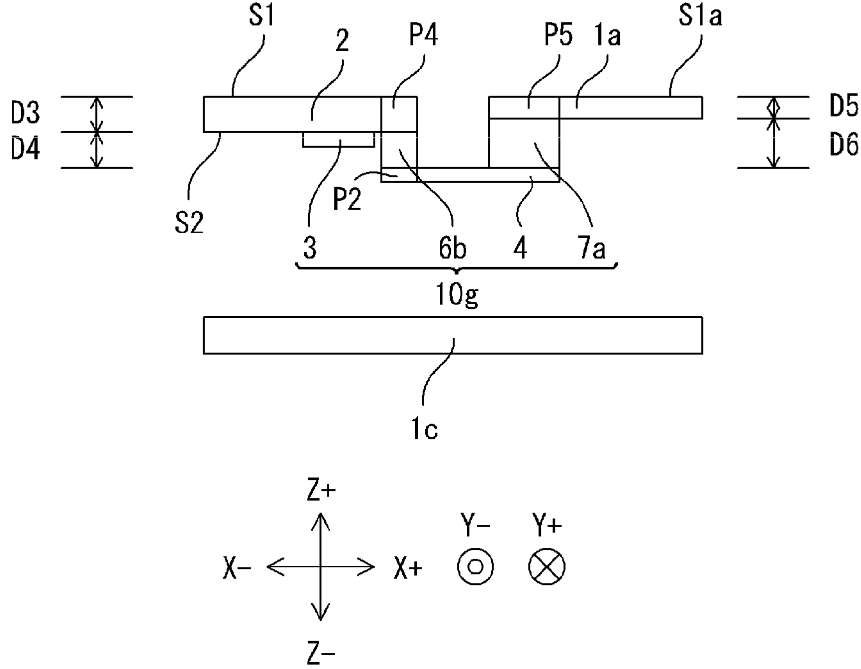
FIG. 18 is a sectional view taken along line C-C of the housing 1, the panel 2, and a vibration structure 10*g* according to a fourth modification.

Hereinafter, a vibration structure 10*g* according to a fourth modification will be described with reference to the drawings. FIG. 18 is a sectional view taken along line C-C of the housing 1, the panel 2, and the vibration structure 10*g* according to the fourth modification. Note that, in the vibration structure 10*g* according to the fourth modification, only portions different from those of the vibration structure 10*d* according to the fourth embodiment will be described, and the description thereof will be omitted.

The vibration structure 10*g* is different from the vibration structure 10*d* in further including the first adhesive material 7*a*.

The first adhesive material 7*a* physically connects the housing 1 and the outer frame 4. More specifically, the first adhesive material 7*a* fixes the outer frame 4 to the housing first portion 1*a*. The first adhesive material 7*a* is, for example, a double-sided tape.

As illustrated in FIG. 18, the housing first portion 1*a* includes the fifth portion P5 overlapping the first adhesive material 7*a* as viewed in the normal direction of the first main surface S1. That is, the housing 1 includes the fifth portion P5 overlapping the first adhesive material 7*a* as viewed in the normal direction of the first main surface S1.

As illustrated in FIG. 18, the fifth portion P5, the first adhesive material 7*a*, and the outer frame 4 are arranged in this order on a straight line parallel to the Z− direction without any space from the Z+ direction to the Z− direction. That is, the housing first portion 1*a*, the first adhesive material 7*a*, and the outer frame 4 are arranged in this order on a straight line parallel to the Z− direction without any space from the Z+ direction to the Z− direction. In the present modification, the thickness D5 of the fifth portion P5 and the thickness D6 of the first adhesive material 7*a* are uniform as illustrated in FIG. 18.

In the present modification, the sum of the thickness D5 of the fifth portion P5 and the thickness D6 of the first adhesive material 7*a* is equal to the sum of the thickness D3 of the fourth portion P4 and the thickness D4 of the second cushioning material 6*b*. As shown in FIG. 18, the outer frame 4 is not bent in the Z-axis direction. That is, as illustrated in FIG. 18, the position in the Z axis direction of the portion of the outer frame 4 overlapping the fifth portion P5 and the second adhesive material 7*b* as viewed in the Z axis direction is equal to the position of the second portion P2 in the Z axis direction.

The above-described vibration structure 10*g* also achieves the same effect as the vibration structure 10*d*. More specifically, the fourth portion P4, the second cushioning material 6*b*, and the outer frame 4 are arranged in this order on a straight line parallel to the Z− direction without any space from the Z+ direction to the Z− direction. The fifth portion P5, the first adhesive material 7*a*, and the outer frame 4 are arranged in this order on a straight line parallel to the Z− direction without any space from the Z+ direction to the Z− direction. The sum of the thickness D5 of the fifth portion P5 and the thickness D6 of the first adhesive material 7*a* is equal to the sum of the thickness D3 of the fourth portion P4 and the thickness D4 of the second cushioning material 6*b*. Therefore, according to the vibration structure 10*g*, the position of the main surface S1*a* in the Z-axis direction and the position of the first main surface S1 in the Z-axis direction can be equalized by equalizing the position in the Z-axis direction of the portion of the outer frame 4 overlapping the fifth portion P5 and the second adhesive material 7*b* as viewed in the Z-axis direction and the position of the second portion P2 in the Z-axis direction. As a result, according to the vibration structure 10*g*, a part of the body of the user can be prevented from being caught between the first main surface S1 and the main surface S1*a*, and the operability of the user can be improved.

Fifth Embodiment

Figure 19:
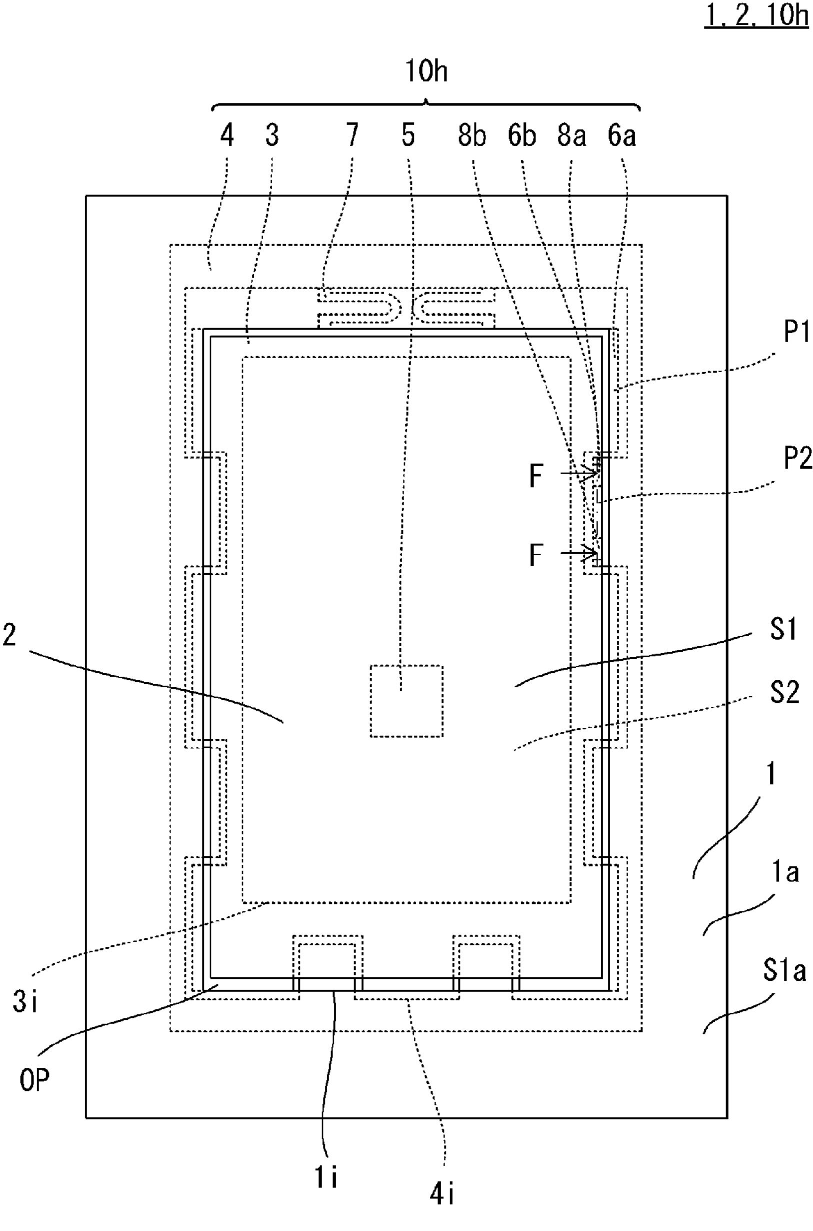
FIG. 19 is a plan view of the housing 1, the panel 2, and a vibration structure 10*h* according to a fifth embodiment as viewed in the Z− direction.
Figure 19:
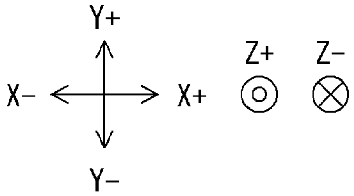
Figure 20:
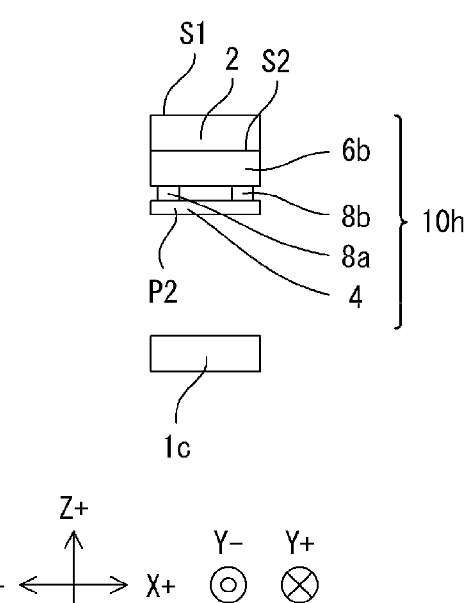
FIG. 20 is a sectional view taken along line F-F of the housing 1, the panel 2, and a vibration structure 10*h* according to the fifth embodiment.

Hereinafter, a vibration structure 10*h* according to a fifth embodiment will be described with reference to the drawings. FIG. 19 is a plan view of the housing 1, the panel 2, and the vibration structure 10*h* according to the fifth embodiment as viewed in the Z− direction. FIG. 20 is a sectional view taken along line F-F of the housing 1, the panel 2, and the vibration structure 10*h* according to the fifth embodiment. In FIG. 19, only the representative first cushioning material 6*a*, second cushioning material 6*b*, first portion P1, and second portion P2 among the plurality of first cushioning materials 6*a*, the plurality of second cushioning materials 6*b*, the plurality of first portions P1, and the plurality of second portions P2 are denoted by reference numerals. Note that, in the vibration structure 10*h* according to the fifth embodiment, only portions different from those of the vibration structure 10 according to the first embodiment will be described, and the description thereof will be omitted.

The vibration structure 10*h* is different from the vibration structure 10 in further including a first electrode 8*a* and a second electrode 8*b*.

In the present embodiment, one second cushioning material 6*b* has conductivity. In the present embodiment, as shown in FIG. 19, the first electrode 8*a* overlaps the second cushioning material 6*b* having conductivity and the outer frame 4 as viewed in the Z-axis direction. The first electrode 8*a* is, for example, a metal film by vapor deposition, a metal film by plating, or a printed electrode film by silver paste.

As illustrated in FIG. 20, the first electrode 8*a* is attached to the second cushioning material 6*b* having conductivity with an adhesive layer (not illustrated) having conductivity interposed therebetween. The first electrode 8*a* is attached to the outer frame 4 with an adhesive layer (not shown) interposed therebetween. Therefore, the second cushioning material 6*b* having conductivity is electrically connected to the first electrode 8*a*.

As illustrated in FIG. 19, the second electrode 8*b* overlaps the second cushioning material 6*b* having conductivity and the outer frame 4 as viewed in the Z-axis direction. The second electrode 8*b* is, for example, a metal film by vapor deposition, a metal film by plating, or a printed electrode film by silver paste.

As illustrated in FIG. 20, the second electrode 8*b* is attached to the second cushioning material 6*b* having conductivity with a second adhesive layer (not illustrated) having conductivity interposed therebetween. The second electrode 8*b* is attached to the second portion P2 with an adhesive layer (not illustrated) interposed therebetween. Therefore, the second cushioning material 6*b* having conductivity is electrically connected to the second electrode 8*b*.

As shown in FIG. 20, the first electrode 8*a* is not in contact with the second electrode 8*b*. That is, the first electrode 8*a* is disposed with a space from the second electrode 8*b*.

The above-described vibration structure 10*h* also achieves the same effect as the vibration structure 10. Further, according to the vibration structure 10*h*, it is possible to detect that the panel 2 is pushed. More specifically, one of the second cushioning materials 6*b* has conductivity. The second cushioning material 6*b* having conductivity is electrically connected to the first electrode 8*a* and the second electrode 8*b*. The first electrode 8*a* is disposed with a space from the second electrode 8*b*. As a result, a resistance value exists between the first electrode 8*a* and the second electrode 8*b*. When the first main surface S1 located between the first electrode 8*a* and the second electrode 8*b* is pushed in the Z− direction as viewed in the Z− direction, the second cushioning material 6*b* is compressed in the Z− direction. As a result, the contact area of the conductor in the second cushioning material 6*b* having conductivity increases, and the resistance value between the first electrode 8*a* and the second electrode 8*b* decreases. Therefore, for example, when the resistance value between the first electrode 8*a* and the second electrode 8*b* falls below a preset threshold, it can be determined that the first main surface S1 is pushed in the Z− direction. As a result, according to the vibration structure 10*h*, it is possible to detect that the panel 2 is pushed.

[Fifth Modification]

Figure 21:
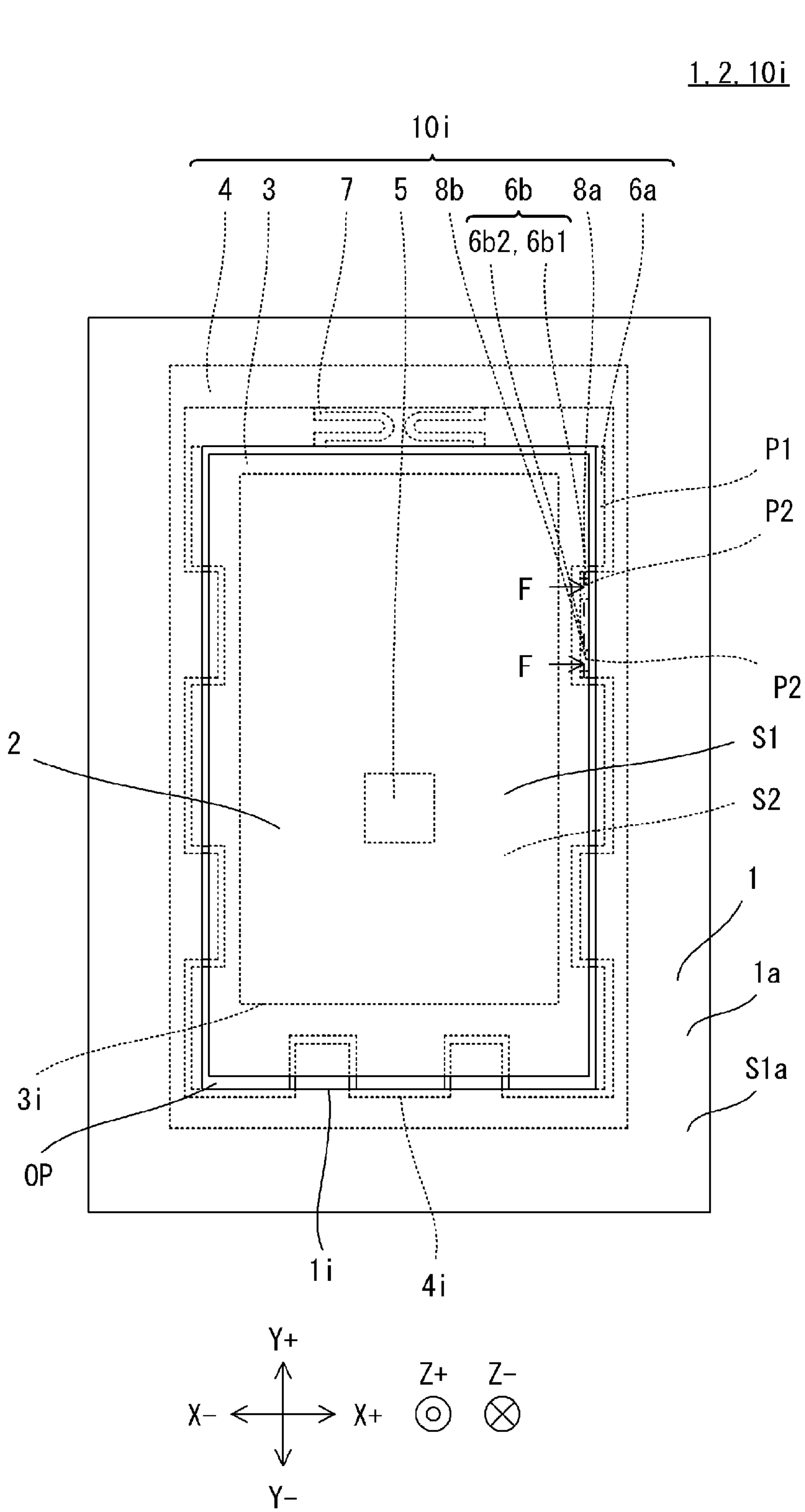
FIG. 21 is a plan view of the housing 1, the panel 2, and a vibration structure 10*i* according to a fifth modification as viewed in the Z− direction.
Figure 22:
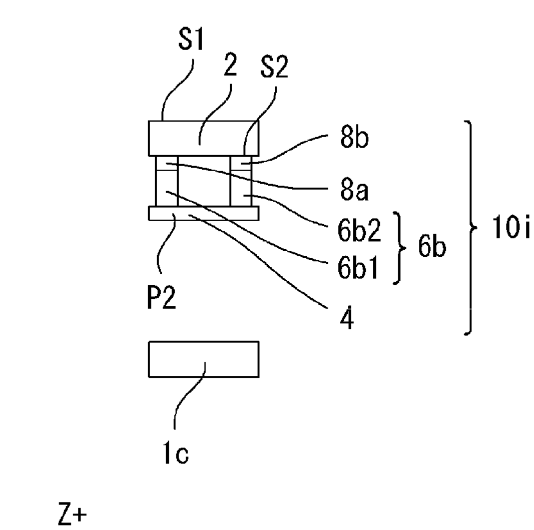
FIG. 22 is a sectional view taken along line F-F of the housing 1, the panel 2, and the vibration structure 10*i* according to the fifth modification.
Figure 22:
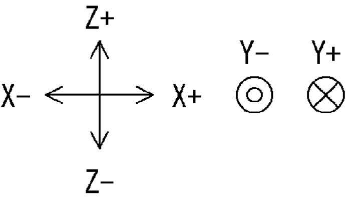

Hereinafter, a vibration structure 10*i* according to a fifth modification will be described with reference to the drawings. FIG. 21 is a plan view of the housing 1, the panel 2, and the vibration structure 10*i* according to the fifth modification as viewed in the Z− direction. FIG. 22 is a sectional view taken along line F-F of the housing 1, the panel 2, and the vibration structure 10*i* according to the fifth modification. In FIG. 21, only the representative first cushioning material 6*a*, second cushioning material 6*b*, first portion P1, and second portion P2 among the plurality of first cushioning materials 6*a*, the plurality of second cushioning materials 6*b*, the plurality of first portions P1, and the plurality of second portions P2 are denoted by reference numerals. Note that, in the vibration structure 10*i* according to the fifth modification, only portions different from those of the vibration structure 10*h* according to the fifth embodiment will be described, and the description thereof will be omitted.

The vibration structure 10*i* is different from the vibration structure 10 in that one second cushioning material 6*b* includes a first conductive cushioning material 6*b*1 and a second conductive cushioning material 6*b*2.

In the present modification, the outer frame 4 has conductivity. The first conductive cushioning material 6*b*1 has conductivity. In addition, the first conductive cushioning material 6*b*1 does not inhibit the vibration of the panel 2. On the other hand, the first conductive cushioning material 6*b*1 has a damping ratio that damps the vibration of the panel 2. In the present modification, as shown in FIG. 21, the first conductive cushioning material 6*b*1 overlaps the first electrode 8*a* and the outer frame 4 as viewed in the Z-axis direction. In the present modification, the first conductive cushioning material 6*b*1 has a rectangular parallelepiped shape.

The second conductive cushioning material 6*b*2 has conductivity. In addition, the second conductive cushioning material 6*b*2 does not inhibit the vibration of the panel 2. On the other hand, the second conductive cushioning material 6*b*2 has a damping ratio that damps the vibration of the panel 2. In the present modification, as shown in FIG. 21, the second conductive cushioning material 6*b*2 overlaps the second electrode 8*b* and the outer frame 4 as viewed in the Z-axis direction. In the present modification, the second conductive cushioning material 6*b*2 has a rectangular parallelepiped shape.

As shown in FIG. 22, the first electrode 8*a* is attached to the second main surface S2 with an adhesive layer (not shown) interposed therebetween. In addition, the first conductive cushioning material 6*b*1 is attached to the first electrode 8*a* with a conductive adhesive layer (not illustrated) interposed therebetween. The first conductive cushioning material 6*b*1 is attached to the outer frame 4 with a conductive adhesive layer (not illustrated) interposed therebetween. Therefore, the first electrode 8*a* and the first conductive cushioning material 6*b*1 are electrically connected to the outer frame 4.

As shown in FIG. 22, the second electrode 8*b* is attached to the second main surface S2 with an adhesive layer (not shown) interposed therebetween. The second conductive cushioning material 6*b*2 is attached to the second electrode 8*b* with a conductive adhesive layer (not illustrated) interposed therebetween. The second conductive cushioning material 6*b*2 is attached to the outer frame 4 with a conductive adhesive layer (not illustrated) interposed therebetween. Therefore, the second electrode 8*b* and the second conductive cushioning material 6*b*2 are electrically connected to the outer frame 4.

As shown in FIG. 22, the first conductive cushioning material 6*b*1 is not in contact with the second conductive cushioning material 6*b*2. That is, the first conductive cushioning material 6*b*1 is disposed with a space from the second conductive cushioning material 6*b*2. The above-described vibration structure 10*i* also achieves the same effect as the vibration structure 10*h*. More specifically, the outer frame 4 has conductivity. The outer frame 4 is electrically connected to the first conductive cushioning material 6*b*1 and the second conductive cushioning material 6*b*2. The first conductive cushioning material 6*b*1 is disposed with a space from the second conductive cushioning material 6*b*2. As a result, a resistance value exists between the first conductive cushioning material 6*b*1 and the second conductive cushioning material 6*b*2. When the first main surface S1 located between the first conductive cushioning material 6*b*1 and the second conductive cushioning material 6*b*2 is pushed in the Z− direction as viewed in the Z− direction, the first conductive cushioning material 6*b*1 and the second conductive cushioning material 6*b*2 are compressed in the Z− direction. As a result, the contact area of the conductor in the first conductive cushioning material 6*b*1 increases, or the contact area of the conductor in the second conductive cushioning material 6*b*2 increases, and the resistance value between the first conductive cushioning material 6*b*1 and the second conductive cushioning material 6*b*2 decreases. Therefore, for example, when the resistance value between the first conductive cushioning material 6*b*1 and the second conductive cushioning material 6*b*2 falls below a preset threshold value, it can be determined that the first main surface S1 is pushed in the Z− direction. As a result, according to the vibration structure 10*i*, it is possible to detect that the panel 2 is pushed.

Sixth Embodiment

Figure 23:
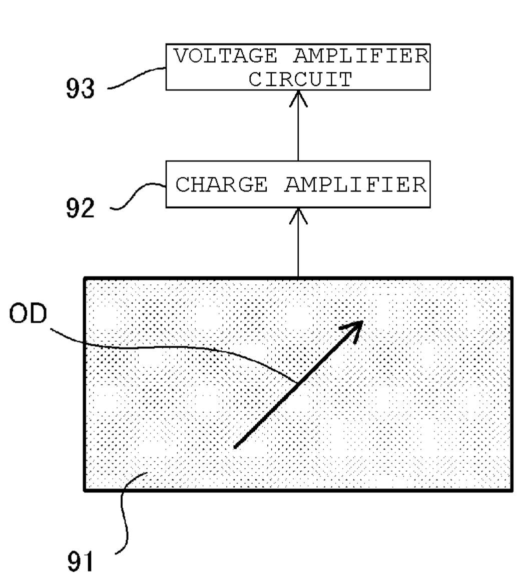
FIG. 23 is a plan view of a sensor 9 according to a sixth embodiment as viewed in the Z− direction.
Figure 23:
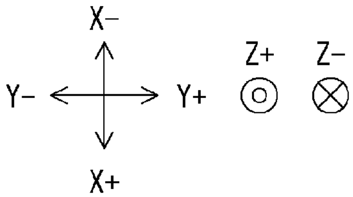
Figure 24:
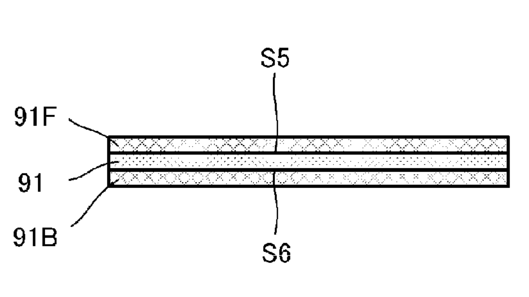
FIG. 24 is a sectional view taken along line D-D of the sensor 9 according to the sixth embodiment.
Figure 24:
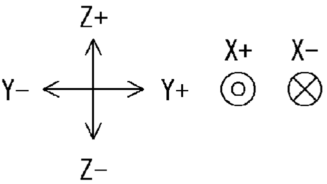
Figure 25:
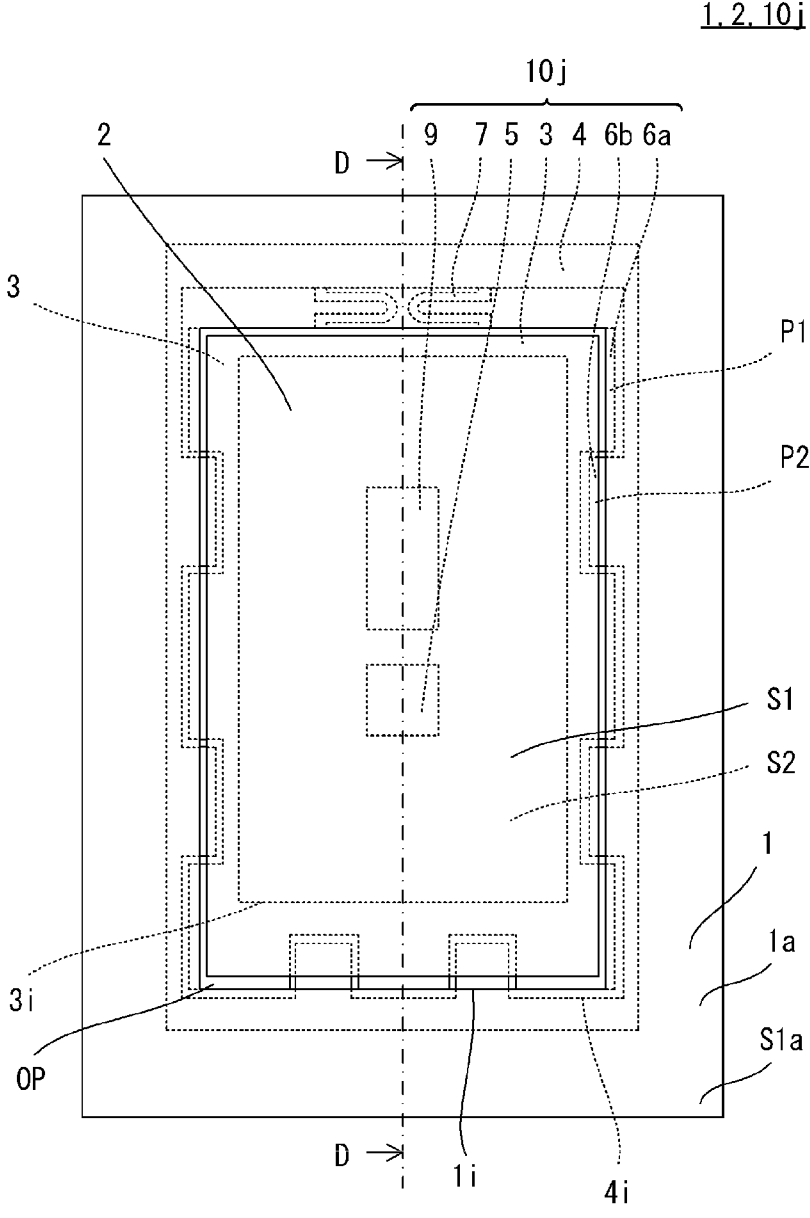
FIG. 25 is a plan view of the housing 1, the panel 2, and a vibration structure 10*j* according to the sixth embodiment as viewed in the Z− direction.
Figure 25:
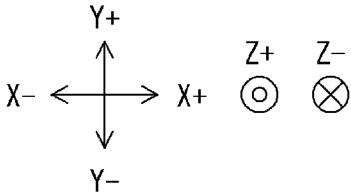
Figure 26:
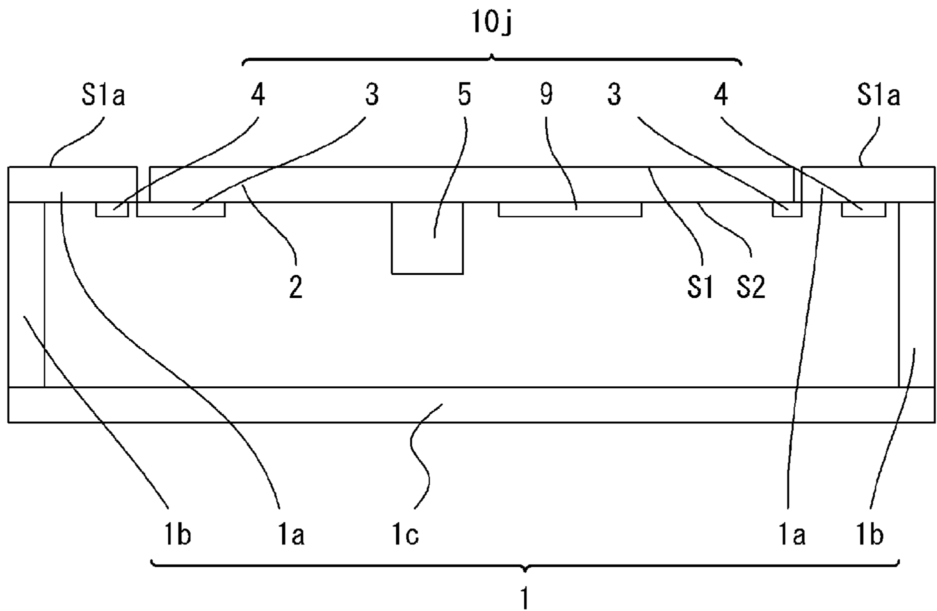
FIG. 26 is a sectional view taken along line D-D of the housing 1, the panel 2, and the vibration structure 10*j* according to the sixth embodiment.
Figure 26:
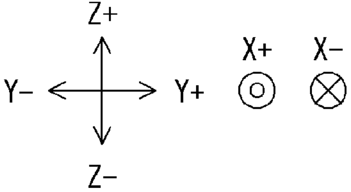

Hereinafter, a vibration structure 10*j* according to a sixth embodiment will be described with reference to the drawings. FIG. 23 is a plan view of a sensor 9 according to the sixth embodiment as viewed in the Z− direction. FIG. 24 is a sectional view taken along line D-D of the sensor 9 according to the sixth embodiment. FIG. 25 is a plan view of the housing 1, the panel 2, and the vibration structure 10*j* according to the sixth embodiment as viewed in the Z− direction. FIG. 26 is a sectional view taken along line D-D of the housing 1, the panel 2, and the vibration structure 10*j* according to the sixth embodiment. In FIG. 25, only the representative first cushioning material 6*a*, second cushioning material 6*b*, first portion P1, and second portion P2 among the plurality of first cushioning materials 6*a*, the plurality of second cushioning materials 6*b*, the plurality of first portions P1, and the plurality of second portions P2 are denoted by reference numerals. Note that, in the vibration structure 10*j* according to the sixth embodiment, only portions different from those of the vibration structure 10 according to the first embodiment will be described, and the description thereof will be omitted.

The vibration structure 10*j* is different from the vibration structure 10 in further including the sensor 9.

The sensor 9 detects bending of the panel 2 in the Z-axis direction. In the present embodiment, the sensor 9 is a piezoelectric sensor. More specifically, as illustrated in FIGS. 23 and 24, the sensor 9 includes a piezoelectric film 91, a third electrode 91F, a fourth electrode 91B, a charge amplifier 92, and a voltage amplifier circuit 93.

The piezoelectric film 91 is an example of a piezoelectric sensor. The piezoelectric film 91 has a film shape. Therefore, as illustrated in FIG. 24, the piezoelectric film 91 has a fifth main surface S5 and a sixth main surface S6. In the present embodiment, the fifth main surface S5 and the sixth main surface S6 have a rectangular shape as viewed in the Z-axis direction. The normal direction of the fifth main surface S5 and the sixth main surface S6 is the Z-axis direction. The longitudinal direction of the piezoelectric film 91 is the Y-axis direction. The short direction of the piezoelectric film 91 is the X-axis direction. In the present embodiment, the piezoelectric film 91 is a PLA film.

The piezoelectric film 91 generates a charge corresponding to a differential value of a deformation amount of the piezoelectric film 91. The polarity of the charge generated when the piezoelectric film 91 is stretched in the Y-axis direction is opposite to the polarity of the charge generated when the piezoelectric film 91 is stretched in the X-axis direction. Specifically, the piezoelectric film 91 is a film made of a chiral polymer. The chiral polymer is, for example, polylactic acid (PLA). The polylactic acid includes a D-type polylactic acid (PDLA) and an L-type polylactic acid (PLLA). Polylactic acid composed of a chiral polymer has a main chain having a helical structure. Polylactic acid has piezoelectricity by being uniaxially stretched to orient molecules. The piezoelectric film 91 has a piezoelectric constant of d14.

An uniaxial stretching axis OD of the piezoelectric film 91 forms an angle of 45 degrees Counterclockwise with respect to the Y+ direction and forms an angle of 45 degrees Clockwise with respect to the X− direction. That is, the piezoelectric film 91 is stretched at least in a uniaxial direction. The 45 degrees include, for example, an angle including about 45 degrees±10 degrees. As a result, the piezoelectric film 91 is deformed such that the piezoelectric film 91 is stretched in the Y-axis direction or deformed such that the piezoelectric film 91 is compressed in the Y-axis direction, thereby generating charges. For example, when the piezoelectric film 91 is deformed so as to be stretched in the Y-axis direction, positive charges are generated. For example, when the piezoelectric film 91 is deformed so as to be compressed in the Y-axis direction, negative charges are generated. The magnitude of the charge depends on a differential value of a deformation amount of the piezoelectric film 91 due to expansion or compression.

The third electrode 91F is a signal electrode. As illustrated in FIG. 24, the third electrode 91F is provided on the fifth main surface S5. The third electrode 91F covers the fifth main surface S5. The fourth electrode 91B is, for example, a metal film by vapor deposition, a metal film by plating, or a printed electrode film by silver paste.

The fourth electrode 91B is a ground electrode. The fourth electrode 91B is connected to the ground potential. As illustrated in FIG. 24, the fourth electrode 91B is provided on the sixth main surface S6. The fourth electrode 91B covers the sixth main surface S6. The fourth electrode 91B is, for example, a metal film by vapor deposition, a metal film by plating, or a printed electrode film by silver paste. Thus, the piezoelectric film 91 is located between the third electrode 91F and the fourth electrode 91B.

The charge amplifier 92 converts the charge generated by the piezoelectric film 91 into a detection signal SigD which is a voltage signal. The charge amplifier 92 outputs the detection signal SigD to the voltage amplifier circuit 93. The voltage amplifier circuit 93 amplifies the detection signal SigD and outputs an output signal SigO.

Such a sensor 9 is attached to the panel 2 as shown in FIGS. 25 and 26. More specifically, the third electrode 91F is fixed to the second main surface S2 of the panel 2.

The output signal SigO is a value corresponding to a differential value of a deformation amount due to bending of the panel 2 in the Z-axis direction. For example, when the panel 2 is pushed in the Z− direction, the piezoelectric film 91 expands and contracts in the Y− direction. As a result, the piezoelectric film 91 generates charges. In the present embodiment, when the deformation of the panel 2 in the Z− direction increases, the piezoelectric film 91 generates positive charges.

The above-described vibration structure 10*j* also achieves the same effect as the vibration structure 10. Further, according to the vibration structure 10*j*, it is possible to detect that the panel 2 is pushed. More particularly, the sensor 9 detects the bending of the panel 2. As a result, for example, when the output signal SigO exceeds a preset threshold, it can be determined that the first main surface S1 is pushed in the Z− direction. As a result, according to the vibration structure 10*h*, it is possible to detect that the panel 2 is pushed.

Seventh Embodiment

Figure 27:
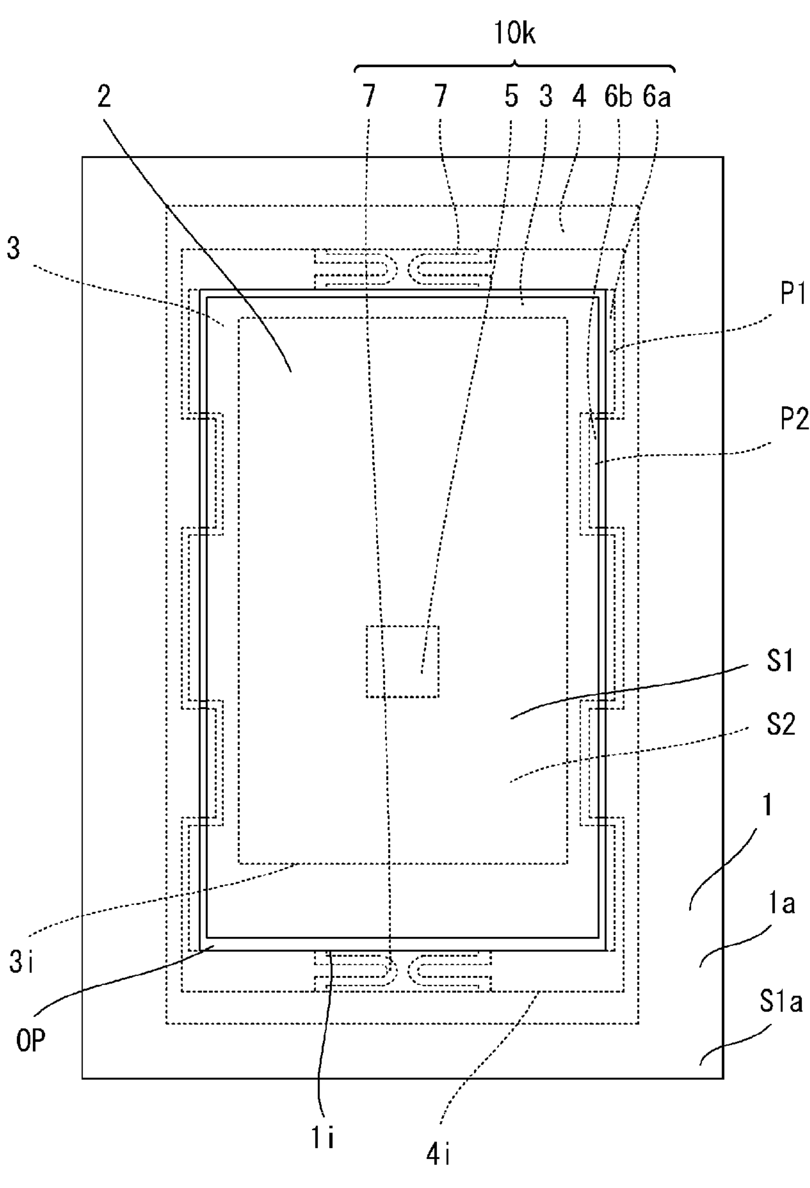
FIG. 27 is a plan view of the housing 1, the panel 2, and a vibration structure 10*k* according to a seventh embodiment as viewed in the Z− direction.
Figure 27:
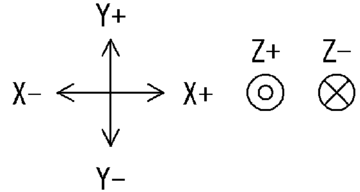

Hereinafter, a vibration structure 10*k* according to a seventh embodiment will be described with reference to the drawings. FIG. 27 is a plan view of the housing 1, the panel 2, and the vibration structure 10*k* according to the seventh embodiment as viewed in the Z− direction. In FIG. 27, only the representative first cushioning material 6*a*, second cushioning material 6*b*, first portion P1, and second portion P2 among the plurality of first cushioning materials 6*a*, the plurality of second cushioning materials 6*b*, the plurality of first portions P1, and the plurality of second portions P2 are denoted by reference numerals. Note that, in the vibration structure 10*k* according to the seventh embodiment, only portions different from those of the vibration structure 10 according to the first embodiment will be described, and the description thereof will be omitted.

The vibration structure 10*k* is different from the vibration structure 10 in including two spring portions 7.

Each of the two spring portions 7 has elasticity. Each of the two spring portions 7 physically connects the inner frame 3 and the outer frame 4.

The above-described vibration structure 10*k* also achieves the same effect as the vibration structure 10. Further, according to the vibration structure 10*k*, the panel 2 and the inner frame 3 can be more firmly supported by the housing 1 and the outer frame 4.

Other Embodiments

The vibration structure according to the present disclosure is not limited to the vibration structures 10 and 10*a* to 10 *k*, and can be changed within the scope of the gist thereof. In addition, the configurations of the vibration structures 10 and 10*a* to 10*k* may be freely combined.

Note that the X-axis direction, the Y-axis direction, and the Z-axis direction in the present specification may not coincide with the X-axis direction, the Y-axis direction, and the Z-axis direction at the time of actual use of the vibration structure 10.

Each of the first main surface S1 and the second main surface S2 may not have a rectangular shape as viewed in the Z-axis direction.

The inner edge 1*i* of the housing first portion 1*a* may not have a rectangular shape as viewed in the Z-axis direction. As a result, the opening OP may not have a rectangular shape as viewed in the Z-axis direction.

The inner edge 3*i* of the inner frame 3 may not have a rectangular shape as viewed in the Z-axis direction.

In the vibration structure 10, the number of the first cushioning materials 6*a* may be one. In the vibration structure 10, the first cushioning material 6*a* is not essential.

In the vibration structure 10, the number of the second cushioning materials 6*b* may be one. In the vibration structure 10, the second cushioning material 6*b* is not essential.

In the vibration structure 10, the spring portion 7 is not essential.

The inner frame 3 and the outer frame 4 may be made of different members, or may be made of the same member. The inner frame 3 and the outer frame 4 may be manufactured, for example, by punching one SUS plate. In this case, the inner frame 3 and the outer frame 4 can be easily manufactured.

The inner frame 3 may be made of resin, for example.

The outer frame 4 may be made of resin, for example.

In the vibration structure 10, the vibration body 5 may not be the LRA.

In the vibration structure 10, the vibration body 5 may not vibrate the panel 2 at the resonance frequency.

In the vibration structure 10, the vibration body 5 may be attached to the inner frame 3. Also in this case, the same effect as that of the vibration structure 10*a* is obtained.

Note that the number of the vibration bodies 5 is not limited to one. The vibration structures 10 and 10*a* to 10*k* may include a plurality of vibration bodies 5. In this case, each of the plurality of vibration bodies 5 may be individually driven.

The first cushioning material 6*a* may not have a rectangular parallelepiped shape. The rectangular parallelepiped shape includes a rectangular parallelepiped and a shape obtained by slightly deforming the rectangular parallelepiped. The shape obtained by slightly deforming the rectangular parallelepiped is, for example, a shape obtained by chamfering corners of the rectangular parallelepiped. For example, the first cushioning material 6*a* may have a cylindrical shape.

The second cushioning material 6*b* may not have a rectangular parallelepiped shape.

In the vibration structure 10*a*, the vibration body 5 may not include the piezoelectric film.

Each of the third main surface S3 and the fourth main surface S4 may not have a short side extending in the X-axis direction and a long side extending in the Y-axis direction.

Each of the third main surface S3 and the fourth main surface S4 may not have a rectangular shape as viewed in the Z-axis direction.

The piezoelectric film 51 may be, for example, a film made of a chiral polymer. When the piezoelectric film 51 is a film made of PVDF, since PVDF has water resistance, the vibration structure 10*a* can vibrate the panel 2 in the same manner under any humidity environment. Further, when the piezoelectric film 51 is a film made of PLLA, PLLA has no current collecting property, so that the panel 2 can be vibrated in the same manner under any temperature environment.

In the vibration structure 10*a*, the waveform of the voltage applied between the electrode provided on the third main surface S3 and the electrode provided on the fourth main surface S4 is, for example, a sine wave, a rectangular wave, a triangular wave, or a trapezoidal wave. By preventing the voltage applied between the electrode provided on the third main surface S3 and the electrode provided on the fourth main surface S4 from including harmonics and high frequencies, it is possible to reduce sound generated by expansion and contraction of the piezoelectric film 51.

In the vibration structure 10*a*, the vibration body 5 may be attached across the inner frame 3 and the housing 1. Also in this case, the same effect as that of the vibration structure 10*a* is obtained.

In the vibration structure 10*a*, the vibration body 5 may be attached across the panel 2 and the housing 1. Also in this case, the same effect as that of the vibration structure 10*a* is obtained.

In the vibration structure 10*a*, the vibration body 5 may be attached across the panel 2 and the outer frame 4. Also in this case, the same effect as that of the vibration structure 10*a* is obtained.

In the vibration structure 10*b*, the widths W1 of the plurality of first wide portions WP1 may be different from each other.

In the vibration structure 10*b*, the widths W2 of the plurality of first narrow portions NP1 may be different from each other.

In the vibration structure 10*b*, the widths W3 of the plurality of second wide portions WP2 may be different from each other.

In the vibration structure 10*b*, the widths W4 of the plurality of second narrow portions NP2 may be different from each other.

In the vibration structure 10*b*, the number of the first wide portions WP1 may be one.

In the vibration structure 10*b*, the number of first narrow portions NP1 may be one.

In the vibration structure 10*b*, the number of the second wide portions WP2 may be one.

In the vibration structure 10*b*, the number of the second narrow portions NP2 may be one.

In the vibration structure 10*b*, as illustrated in FIG. 9, the inner frame 3 and the outer frame 4 also have shapes extending along the short side of the first main surface S1 as viewed in the normal direction of the first main surface S1. In this case, as illustrated in FIG. 9, the first wide portions WP1 and the second narrow portions NP2 may be arranged in this order from the Y+ direction to the Y− direction on a straight line parallel to the Y− direction. As illustrated in FIG. 9, the first narrow portions NP1 and the second wide portions WP2 may be arranged in this order from the Y+ direction to the Y− direction on a straight line parallel to the Y− direction.

In the vibration structure 10*d*, the thickness D1 of the third portion P3, the thickness D2 of the first cushioning material 6*a*, the thickness D3 of the fourth portion P4, or the thickness D4 of the second cushioning material 6*b* may be non-uniform. In this case, the sum of an average thickness D1Ave of the third portion P3 and an average thickness D2Ave of the first cushioning material 6*a* may be equal to the sum of an average thickness D3Ave of the fourth portion P4 and an average thickness D4Ave of the second cushioning material 6*b*.

In the vibration structure 10*e*, the thickness D5 of the fifth portion P5, the thickness D6 of the first adhesive material 7*a*, the thickness D7 of the sixth portion P6, or the thickness D8 of the second adhesive material 7*b* may be non-uniform. In this case, the sum of an average thickness D5Ave of the fifth portion P5 and an average thickness D6Ave of the first adhesive material 7*a* may be equal to the sum of an average thickness D7Ave of the sixth portion P6 and an average thickness D8Ave of the second adhesive material 7*b*.

In the vibration structure 10*f*, the thickness D1 of the third portion P3, the thickness D2 of the first cushioning material 6*a*, the thickness D7 of the sixth portion P6, or the thickness D8 of the second adhesive material 7*b* may be non-uniform. In this case, the sum of the average thickness D1Ave of the third portion P3 and the average thickness D2Ave of the first cushioning material 6*a* may be equal to the sum of the average thickness D7Ave of the sixth portion P6 and the average thickness D8Ave of the second adhesive material 7*b*.

In the vibration structure 10*g*, the thickness D5 of the fifth portion P5, the thickness D6 of the first adhesive material 7*a*, the thickness D3 of the fourth portion P4, or the thickness D4 of the second cushioning material 6*b* may be non-uniform. In this case, the sum of the average thickness D5Ave of the fifth portion P5 and the average thickness D6Ave of the first adhesive material 7*a* may be equal to the sum of the average thickness D3Ave of the fourth portion P4 and the average thickness D4Ave of the second cushioning material 6*b*.

The first adhesive material 7*a* may not be a double-sided tape.

The second adhesive material 7*b* may not be a double-sided tape.

In the vibration structure 10*h*, each of the plurality of second cushioning materials 6*b* may have conductivity.

In the vibration structure 10*i*, each of the plurality of second cushioning materials 6*b* may include the first conductive cushioning material 6*b*1 and the second conductive cushioning material 6*b*2.

The first conductive cushioning material 6*b*1 may not have a rectangular parallelepiped shape.

The second conductive cushioning material 6*b*2 may not have a rectangular parallelepiped shape.

The sensor 9 may be attached to the inner frame 3. Also in this case, the same effect as that of the vibration structure 10*j* is obtained.

Note that the sensor 9 may be attached across the panel 2 and the housing 1. Also in this case, the same effect as that of the vibration structure 10*j* is obtained.

Note that the sensor 9 may be attached across the panel 2 and the outer frame 4. Also in this case, the same effect as that of the vibration structure 10*j* is obtained.

Note that the sensor 9 may be attached across the inner frame 3 and the housing 1. Also in this case, the same effect as that of the vibration structure 10*j* is obtained.

Note that the sensor 9 may be attached across the inner frame 3 and the outer frame 4. Also in this case, the same effect as that of the vibration structure 10*j* is obtained.

The piezoelectric film 91 may have a piezoelectric constant of d31. The piezoelectric film 91 having a piezoelectric constant of d31 is, for example, a film made of PVDF.

Each of the fifth main surface S5 and the sixth main surface S6 may not have a rectangular shape as viewed in the Z-axis direction. The rectangular shape includes a rectangular shape and a shape obtained by slightly deforming the rectangular shape. The shape obtained by slightly deforming the rectangle is, for example, a shape obtained by chamfering corners of the rectangle. For example, each of the fifth main surface S5 and the sixth main surface S6 may have an elliptical shape or a square shape as viewed in the Z-axis direction.

The longitudinal direction of the piezoelectric film 91 is not limited to the Y-axis direction, and may be the X-axis direction or any direction. The lateral direction of the piezoelectric film 91 is not limited to the X-axis direction, and may be the Y-axis direction or any direction.

Note that the sensor 9 is not limited to the piezoelectric sensor, and may be a strain gauge or a capacitive sensor. Also in this case, the same effect as that of the vibration structure 10*j* is obtained.

In the vibration structure 10*k*, the number of the spring portions 7 may be three or more.

The vibration structures 10 and 10*a* to 10*k* may be used for a panel module. In this case, the panel module 20 includes the vibration structure 10 and the panel 2.

The vibration structures 10 and 10*a* to 10*k* may be used for a housing module. In this case, the housing module 30 includes the vibration structure 10 and the housing 1. The housing module 30 may further include the panel 2.

DESCRIPTION OF REFERENCE SYMBOLS

1: Housing
1*a*: Housing first portion
1*b*: Housing second portion
1*c*: Housing third portion
1*i*, 3*i*, 4*i*: Inner edge
2: Panel
3: Inner frame
4: Outer frame
5: Vibration body
6*a*: First cushioning material
6*b*: Second cushioning material
6*b*1: First conductive cushioning material
6*b*2: Second conductive cushioning material
7: Spring portion
7*a*: First adhesive material
7*b*: Second adhesive material
8*a*: First electrode
8*b*: Second electrode
9: Sensor
10, 10*a* to 10*k*: Vibration structure
20: Panel module
30: Housing module
51: Piezoelectric film
91: Piezoelectric film
91F: Third electrode
91B: Fourth electrode
92: Charge amplifier
93: Voltage amplifier circuit
D1 to D8: Thickness
D1Ave to D8Ave: Average thickness
NP1: First narrow portion
NP2: Second narrow portion
OD: Uniaxial stretching axis
OP: Opening
P1: First portion
P2: Second portion
P3: Third portion
P4: Fourth portion
P5: Fifth portion
P6: Sixth portion
S1*a*: Main surface
S1: First main surface
S2: Second main surface
S3: Third main surface
S4: Fourth main surface
S5: Fifth main surface
S6: Sixth main surface
SigD: Detection signal
SigO: Output signal
WP1: First wide portion
WP2: Second wide portion

The invention claimed is:

1. A vibration structure comprising:

a housing;

a panel having a main surface;

an inner frame physically connected to the panel and the housing, the inner frame including a first portion overlapping the housing as viewed in a normal direction of the main surface;

an outer frame physically connected to the panel and the housing, the outer frame surrounding the inner frame as viewed in the normal direction, and the outer frame including a second portion overlapping the panel as viewed in the normal direction; and a vibration body that vibrates the panel, wherein (A) or (B):

(A) the vibration body is attached to the panel or the inner frame; or (B) the vibration body is attached across the panel or the inner frame, and the housing or the outer frame.

2. The vibration structure according to claim 1, further comprising:

a first cushioning material overlapping the first portion as viewed in the normal direction and physically connecting the housing and the inner frame; and a second cushioning material overlapping the second portion as viewed in the normal direction and physically connecting the panel and the outer frame.

3. The vibration structure according to claim 2, wherein the inner frame includes a first wide portion having a wide width and a first narrow portion having a narrow width, the outer frame includes a second wide portion having a wide width and a second narrow portion having a narrow width, the inner frame is physically connected to the housing by the first wide portion, and the outer frame is physically connected to the panel by the second wide portion.

4. The vibration structure according to claim 2, wherein a number of the first cushioning materials is two or more, a number of the second cushioning materials is two or more, the inner frame and the outer frame each have a shape extending along one side of the main surface as viewed in the normal direction, and the first cushioning material and the second cushioning material are alternately arranged on a straight line parallel to a first direction in which the inner frame and the outer frame extend.

5. The vibration structure according to claim 4, wherein the first cushioning material and the second cushioning material are in contact with each other on the straight line parallel to the first direction.

6. The vibration structure according to claim 2, wherein the housing includes a third portion overlapping the first cushioning material as viewed in the normal direction, the panel includes a fourth portion overlapping the second cushioning material as viewed in the normal direction, and a sum of a length in the normal direction of the third portion and a length in the normal direction of the first cushioning material is equal to a sum of a length in the normal direction of the fourth portion and a length in the normal direction of the second cushioning material.

7. The vibration structure according to claim 2, further comprising:

a first adhesive material physically connecting the housing and the outer frame; and a second adhesive material physically connecting the panel and the inner frame;

wherein the housing includes a fifth portion overlapping the first adhesive material as viewed in the normal direction, wherein the panel includes a sixth portion overlapping the second adhesive material as viewed in the normal direction, and wherein a sum of a length in the normal direction of the fifth portion and a length in the normal direction of the first adhesive material is equal to a sum of a length in the normal direction of the sixth portion and a length in the normal direction of the second adhesive material.

8. The vibration structure according to claim 2, further comprising:

a second adhesive material physically connecting the panel and the inner frame;

wherein the housing includes a third portion overlapping the first cushioning material as viewed in the normal direction, wherein the panel includes a sixth portion overlapping the second adhesive material as viewed in the normal direction, and wherein a sum of a length in the normal direction of the third portion and a length in the normal direction of the first cushioning material is equal to a sum of a length in the normal direction of the sixth portion and a length in the normal direction of the second adhesive material.

9. The vibration structure according to claim 2, further comprising:

a first adhesive material physically connecting the housing and the outer frame;

wherein the housing includes a fifth portion overlapping the first adhesive material as viewed in the normal direction, wherein the panel includes a fourth portion overlapping the second cushioning material as viewed in the normal direction, and wherein a sum of a length in the normal direction of the fifth portion and a length in the normal direction of the first adhesive material is equal to a sum of a length in the normal direction of the fourth portion and a length in the normal direction of the second cushioning material.

10. The vibration structure according to claim 2, further comprising:

a first electrode; and a second electrode, wherein the first cushioning material has conductivity, the first cushioning material is electrically connected to the first electrode and the second electrode, and the first electrode is disposed with a space from the second electrode.

11. The vibration structure according to claim 2, wherein the outer frame has conductivity, the second cushioning material includes a first conductive cushioning material having conductivity and a second conductive cushioning material having conductivity, the first conductive cushioning material and the second conductive cushioning material are electrically connected to the outer frame, and the first conductive cushioning material is disposed with a space from the second conductive cushioning material.

12. The vibration structure according to claim 1, further comprising:

a sensor that detects bending of the panel, and wherein (C) or (D):

(C) the sensor is attached to the panel or the inner frame; or (D) the sensor is attached across the panel or the inner frame, and the housing or the outer frame.

13. The vibration structure according to claim 12, wherein the sensor is any one of a strain gauge, a capacitive sensor, and a piezoelectric sensor.

14. The vibration structure according to claim 1, further comprising:

a spring portion having elasticity, the spring portion physically connecting the inner frame and the outer frame.

15. The vibration structure according to claim 1, wherein the housing includes an opening, the panel is surrounded by the opening as viewed in the normal direction, and the main surface is exposed from the opening.

16. A panel module comprising:

a panel having a main surface;

an inner frame physically connected to the panel, the inner frame including a first portion extending outwardly past the panel as viewed in a normal direction of the main surface;

an outer frame physically connected to the panel, the outer frame surrounding the inner frame as viewed in the normal direction, and the outer frame including a second portion overlapping the panel as viewed in the normal direction; and a vibration body that vibrates the panel, wherein (A) or (B):

(A) the vibration body is attached to the panel or the inner frame; or (B) the vibration body is attached across the panel and the outer frame, or the inner frame and the outer frame.

17. The panel module according to claim 16, further comprising:

a first cushioning material overlapping the second portion as viewed in the normal direction and physically connecting the panel and the outer frame.

18. A housing module comprising:

a housing;

an inner frame physically connected to the housing, the inner frame including a first portion overlapping the housing as viewed in a normal direction of a main surface of the housing;

an outer frame physically connected to the housing, the outer frame surrounding the inner frame as viewed in the normal direction, and the outer frame including a second portion extending outwardly past the housing as viewed in the normal direction; and a vibration body, wherein (A) or (B):

(A) the vibration body is attached to the inner frame; or (B) the vibration body is attached across the inner frame and the housing, or the inner frame and the outer frame.

19. The housing module according to claim 18, further comprising:

a first cushioning material overlapping the first portion as viewed in the normal direction and physically connecting the housing and the inner frame.

* * * * *